United States Patent
König et al.

(10) Patent No.: US 10,262,535 B2
(45) Date of Patent: Apr. 16, 2019

(54) VEHICLE MANAGEMENT SYSTEM

(71) Applicants: TomTom Development Germany GmbH, Amsterdam (NL); TomTom International B.V., Amsterdam (NL)

(72) Inventors: Felix Godafoss König, Berlin (DE); Rijn Buve, Leiden (NL); Ruud M. L. Diterwich, Hilversum (NL)

(73) Assignee: TOMTOM TELEMATICS B.V., Amsterdam (NL)

( * ) Notice: Subject to any disclaimer, the term of this patent is extended or adjusted under 35 U.S.C. 154(b) by 0 days.

(21) Appl. No.: 14/758,829

(22) PCT Filed: Dec. 31, 2013

(86) PCT No.: PCT/EP2013/078175
§ 371 (c)(1),
(2) Date: Jul. 1, 2015

(87) PCT Pub. No.: WO2014/106617
PCT Pub. Date: Jul. 10, 2014

(65) Prior Publication Data
US 2015/0339923 A1 Nov. 26, 2015

(30) Foreign Application Priority Data

Jan. 1, 2013 (GB) .................................. 1300006.2

(51) Int. Cl.
*G08G 1/00* (2006.01)
*G01C 21/26* (2006.01)
(Continued)

(52) U.S. Cl.
CPC ............. *G08G 1/127* (2013.01); *G01C 21/26* (2013.01); *G08G 1/202* (2013.01); *H04L 67/12* (2013.01)

(58) Field of Classification Search
CPC ........ G08G 1/127; G08G 1/202; G01C 21/26; H04L 67/12
See application file for complete search history.

(56) References Cited

U.S. PATENT DOCUMENTS

| | | | |
|---|---|---|---|
| 5,168,451 A | 12/1992 | Bolger | |
| 6,356,838 B1 * | 3/2002 | Paul | G01C 21/3453 701/410 |

(Continued)

FOREIGN PATENT DOCUMENTS

| | | |
|---|---|---|
| CN | 101887440 A | 11/2010 |
| CN | 102402852 A | 4/2012 |

(Continued)

OTHER PUBLICATIONS

Search Report for United Kingdom Application No. GB1300006.2 dated Mar. 25, 2013.
(Continued)

*Primary Examiner* — Aaron L Troost

(57) ABSTRACT

A vehicle request management system having a server (10) arranged to communicate with a plurality of vehicle requesting devices (12) and a plurality of vehicles (14), each being equipped with a device (200) having route planning and navigation functionality. Upon receipt of a vehicle request, the server allocates the request to an existing cluster of vehicle requests if it is related to the requests. If it is not related to the requests, the request is used to generate a new cluster. The relationship between new vehicle requests and those of existing clusters is assessed based on a proximity of a pick-up location associated with the new request to a pick-up location of an existing request. The relationship is assessed using a parameter that is selected based on a geographical and temporal density of vehicle requests in a region associated with the cluster. When the cluster meets a threshold in relation to age of an oldest request associated (Continued)

with it, or alternatively a maximum size threshold, the requests in the cluster are subjected to a matching process to match a vehicle to each request for fulfilling the request.

19 Claims, 12 Drawing Sheets

(51) Int. Cl.
*G08G 1/127* (2006.01)
*H04L 29/08* (2006.01)

(56) References Cited

U.S. PATENT DOCUMENTS

| | | | |
|---|---|---|---|
| 2004/0076280 A1 | 4/2004 | Ando et al. | |
| 2004/0243430 A1* | 12/2004 | Horstemeyer | B60R 25/102 340/928 |
| 2006/0034201 A1 | 2/2006 | Umeda | |
| 2009/0313077 A1* | 12/2009 | Wheeler, IV | G01C 21/26 705/7.14 |
| 2010/0153279 A1* | 6/2010 | Zahn | G06Q 10/02 705/80 |
| 2011/0301985 A1* | 12/2011 | Camp | G06Q 10/02 705/5 |
| 2012/0130627 A1 | 5/2012 | Islam | |
| 2013/0073327 A1* | 3/2013 | Edelberg | G06Q 10/047 705/7.13 |
| 2013/0179205 A1* | 7/2013 | Slinin | G06Q 10/04 705/7.13 |
| 2013/0339168 A1* | 12/2013 | White | G06Q 30/0601 705/26.1 |

FOREIGN PATENT DOCUMENTS

| | | | |
|---|---|---|---|
| CN | 102637359 A | | 8/2012 |
| GB | 2431535 A | | 4/2007 |
| JP | 2001291193 A | | 10/2001 |
| JP | 2003196792 A | | 12/2001 |
| JP | 2003233656 A | | 8/2003 |
| JP | 2006040007 A | | 2/2006 |
| JP | 2009146300 A | | 7/2009 |
| JP | 2012083933 A | | 10/2010 |
| WO | 9833336 A2 | | 7/1998 |
| WO | 0172078 A1 | | 9/2001 |
| WO | 2006128946 A1 | | 12/2006 |
| WO | 2012143300 A1 | | 10/2012 |

OTHER PUBLICATIONS

International Search Report for International Application No. PCT/EP2013/078175 dated Mar. 19, 2014.

* cited by examiner

VEHICLE MANAGEMENT SYSTEM

CROSS-REFERENCES TO RELATED APPLICATIONS

This application is the National Stage of International Application No. PCT/EP2013/078175, filed Dec. 31, 2013, and designating the United States, which claims benefit to United Kingdom Patent Application No. 1300006.2 filed Jan. 1, 2013. The entire content of these applications is incorporated herein by reference.

FIELD OF INVENTION

The present invention relates to a method and system for managing vehicle requests, such as requests by a user for a taxi or other similar form of transport. In particular, although not exclusively the present invention relates to a method and system for matching vehicle requests to vehicles for fulfilling the requests.

BACKGROUND TO THE INVENTION

In recent years, with the adoption of location-aware mobile devices, such as smart phones, by the general public, a number of software applications (or "apps") have been created to improve the experience of ordering and requesting taxis. Examples of these apps include: Hailo—http://hailocab.com; myTaxi—http://www.mytaxi.net/; and Taxi Magic—http://taximagic.com.

Through the use of such apps on a location-aware mobile device, e.g. one having GNSS (Global Navigation Satellite Systems) signal reception and processing functionality, a user can easily request a taxi to their current location, even if they themselves are not aware of their surroundings.

For example, with the Hailo app, a user is shown a map on their mobile device, centred on their current location, indicating the real-time location of the closest available taxis to their location and an estimate of the time that it will take each taxi to reach the location. This information is downloaded from a server system that receives periodic updates from location-aware devices in each of the taxis. The user can select a taxi by touching an icon representative of the taxi on a touchscreen of their device, and an order request is then sent to the selected taxi via the server. If the driver accepts the order request, a confirmation message is sent to the user. The user is also provided with a profile picture of the driver, a user rating associated with the driver, details of the selected taxi and a real-time countdown of when the taxi should arrive at the pick-up location; this is an estimate as it doesn't take account of traffic, roadworks and other such events that may cause a delay to the taxi. The user can also see the current position of the selected taxi on a map as it approaches the pick-up location. A notification is sent to the user, again via the server, that the taxi has arrived at the pick-up location. Once the journey has been completed, the user can pay for the trip using a credit card or similar form of non-cash payment; assuming that the details of the card have been previously associated with their account on the server. The user then receives a message from the server confirming the details of the journey and a receipt for the amount paid. The user can also take the opportunity to rate their driver following completion of the journey.

Despite the improvements that have been made in relation to requesting taxis through the use of location-aware devices, the Applicant believes that there remains scope for further improvement to methods and systems for managing vehicle requests. In particular, the Applicant has realised that there remains scope for further improvement to such methods and systems in relation to the manner in which vehicle requests are matched to vehicles, e.g. taxis.

SUMMARY OF THE INVENTION

In accordance with a first aspect of the invention, there is provided a method of managing vehicle requests at a server, the server having access to data indicative of a current location of each of a plurality of vehicles, the method comprising:

receiving a plurality of vehicle requests at a server;

generating one or more clusters, each cluster comprising a plurality of the vehicle requests; and matching a vehicle to each respective vehicle request within the or each cluster.

The present invention relates to a method for managing vehicle requests. The method involves receiving a plurality of vehicle requests at a server. The server has knowledge of the current position of each of a plurality of vehicles, e.g. taxis. Vehicle requests are first assigned to clusters, and vehicles are matched to the requests on a cluster-by-cluster basis.

It will be appreciated that the present invention, in accordance with this aspect of the invention at least, does not merely allocate vehicles to vehicle requests on an individual request-by-request basis, i.e. as each request comes in, by reference to the proximity of a current position of a vehicle to a location associated with a vehicle request, e.g. a desired pick-up location. Instead, vehicle requests are first clustered, with vehicles being allocated to requests within each cluster on a cluster by cluster basis. Thus, for example, a request which is the first, i.e. earliest request in a given cluster, will not be allocated a vehicle until the cluster is "complete". Allocation may then take into account all of the requests assigned to the cluster, and their associated locations, enabling matching of vehicles to requests to be optimised. This is in contrast to conventional systems, such as the apps described above, where a user is able to select a taxi from one or more available taxis which are displayed to the user on the basis of their proximity to the users current location. In other conventional systems a taxi may be automatically allocated to a given request, again on the basis of a current location of the taxi being a closest taxi to the current position of the user. In these systems a taxi is allocated to a given request without taking into consideration any other requests.

By clustering vehicle requests into groups before allocating or matching vehicles to the requests, it has been found that the matching of vehicles to requests may be carried out in a manner which is better optimised in respect of wait time for users, e.g. requesters. By waiting until a group of requests has been received, which form a cluster according to certain criteria described herein, and then allocating vehicles to requests in that cluster, it is possible to take a higher level overview of the requests and available vehicles, such that average wait times for users may be improved. In this way, the present invention may address certain shortcomings associated with conventional techniques in which each request for a vehicle is individually matched to a closest available vehicle. The conventional approach may result in shorter wait times for some users, but at the expense of other users. Such systems do not allow optimisation in terms of reducing average wait time over multiple users. The cluster based system of the present invention also provides the ability to better balance the demands of vehicle users and vehicle drivers, e.g. by balancing wait times for users against distance to be travelled by vehicle drivers to fulfil a vehicle request. This is in contrast to systems in which a closest vehicle is allocated to a vehicle request on a request-by-request basis, which may potentially result in one vehicle operator having a small distance to travel to a pick-up, but the next having an undesirably long distance to travel, in the same way that may occur with wait times for users.

Further, and in accordance with a second aspect of the invention there is provided a vehicle request management system, the system comprising a server having access to data indicative of a current location of each of a plurality of vehicles, the server comprising:

communication means arranged to receive a plurality of vehicle requests;

processing means arranged to generate one or more clusters, each cluster comprising a plurality of the vehicle requests; and processing means arranged to match a vehicle to each respective vehicle request within the or each cluster.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The processing means for carrying out any of the steps of the computer implemented method may comprise a set of one or more processors configured, e.g. programmed, for doing so. A given step may be carried out using the same or a different set of processors to any other step. Any given step may be carried out using a combination of sets of processors.

The present invention in any of its embodiments is applicable to matching vehicles to vehicle requests in respect of any type of vehicle. The vehicle is preferably a vehicle which may be requested, along with its driver, to carry one or more passengers from a pick-up location to a drop-off location. In particularly preferred embodiments the vehicle is a taxi or similar form of transport. The vehicle may be a motor vehicle, such as a taxi, sedan, limousine or other powered vehicle. In other embodiments the vehicle may be a human powered vehicle, such as a bicycle or rickshaw.

As discussed above, the present invention is directed to a vehicle request management system. In other words, a system whereby a person, or typically a plurality of different people, can make a request for a vehicle to meet him or her at a particular location (the "pick-up location"), and in some cases additionally at a particular time. The system is used to assign a vehicle (or, in some cases, vehicles) to each request. The vehicle request system of the present invention is particularly applicable to managing taxi requests, such as in large towns and cities, but it will be understood that the system can be used with any type of vehicle requests as appropriate.

The method comprises receiving a plurality of vehicle requests at a server, and the system comprises a server having communication means for receiving the plurality of vehicle requests. While reference herein is made to a "server", it will be appreciated that any suitable central controller may be used, and references to a "server" herein may be replaced by references to a "central controller".

In preferred embodiments the plurality of vehicle requests are received from a set of a plurality of first devices. The first devices may be any suitable devices that may be used to make a vehicle request. For example, the first device may be a device having a fixed location, such as a personal computer or other computing resource. The first device may also comprise a device that is arranged to be positioned within a building or at an outdoor meeting point, such as a hotel, bar, restaurant, station or the like, and which typically is associated with only a single pick-up location. In preferred embodiments, however, the first device comprises a mobile device, such as a mobile telephone, PDA, tablet computer or the like, that can be carried by a user.

In accordance with the present invention, the server has access to data indicative of at least a current location of each of a plurality of vehicles. Each vehicle is an available vehicle for fulfilling a vehicle request. In some embodiments the communication means of the server is arranged to receive the data indicative of at least the current location of each of the plurality of vehicles. The method may comprise the server receiving the data indicative of the current location of each of the plurality of vehicles. The server may comprise data storage means storing the data indicative of at least a current location of each of the plurality of vehicles. Each vehicle is preferably associated with a driver. Thus, the position of a vehicle may be taken to correspond to the position of a driver.

Preferably the server has access to positional data relating to the position of each vehicle over time. Preferably the data indicative of the current location of each of the plurality of vehicles is data indicative of the current location of each of a set of a plurality of second devices, each of the second devices being associated with a respective vehicle. For example, a second device may be mounted within a respective vehicle or associated with the vehicle in any suitable manner such that the position of the second device will correspond to the position of the vehicle. Preferably the data is positional data relating to the position of each second device over time. Preferably the server is in communication with each of a set of a plurality of second devices each being associated with a vehicle. The communication means of the server is preferably additionally arranged to receive the data indicative of the current location of each of the plurality of vehicles, and preferably data indicative of a current location of each of a set of a plurality of second devices, each of the second devices being associated with a respective vehicle. The server, e.g. communication means thereof, may receive positional data relating to position of the, and preferably each, of the second devices over time, and thus the vehicles associated therewith.

The data indicative of the current location of a vehicle is preferably associated with data indicative of the vehicle to which the data relates. The data indicative of the vehicle may directly or indirectly identify the vehicle, and allow the communication means to communicate with the vehicle, e.g. to communicate a vehicle request to the vehicle. The data indicative of the vehicle is, in preferred embodiments, provided by data indicative of a second device associated with the vehicle as described above. The data indicative of the vehicle may comprise additional data, e.g. indicative of a type, size, or other attributes of the vehicle. This may enable matching of vehicle requests to suitable vehicles to be carried out in relation to multiple criteria, as discussed below.

In preferred embodiments the system comprises a server, which comprises communication means for communicating with a set of a plurality of first devices, which are used to make a vehicle request, and a set of a plurality of second devices associated with respective vehicles for fulfilling a submitted vehicle request. The first devices may be carried by users and the second devices may be mounted to vehicles. In embodiments therefore, the vehicle request management system comprises a server comprising communication means arranged to communicate with a plurality of first devices and a plurality of second devices each being associated with a vehicle. The plurality of first devices are a plurality of different first devices and the plurality of second devices are a plurality of different second devices. It will be understood that the present invention therefore extends to encompass a vehicle request management system comprising a server, and a set of a plurality of first devices and/or second devices, as appropriate.

In accordance with the invention, the method comprises the server receiving a plurality of vehicle requests, each comprising at least a first location, preferably wherein the vehicle requests are received from respective first devices, and the server of the system comprises communication means for receiving such data. The first location is preferably a pick-up location, i.e. where a user desires to be picked-up by a vehicle. It will be appreciated that, if not explicitly stated, references to a vehicle request comprising a first location or similar may be understood to refer to the request comprising data indicative of the first location or similar. A vehicle request, e.g. that is submitted by a first device and subsequently received by the server, may only comprise data indicative of the first location. However, the vehicle request may comprise other data in addition to the data indicative of the first location.

In some embodiments each vehicle request may further comprise data indicative of a destination location (or "drop-off location") and/or a pick-up time. The destination location will be indicative of a location where a user wishes to be dropped off by a vehicle, and a pick-up time will be indicative of a time at which the user wishes to be picked up by the vehicle. The present invention is particularly applicable to matching vehicle requests requiring an "immediate" pick-up. Requests of this type may be referred to as "as soon as possible" type requests, and will not usually include data indicative of a desired pick-up time. The present invention provides the ability to fulfil multiple such request in a more efficient manner, so as to globally minimise waiting time as a result of the clustering technique employed. However, it will be appreciate that the invention is also applicable to so-called "scheduled" vehicle requests requiring pick up at a specified future time. In this case, the vehicle request will include data indicative of a pick-up time.

As discussed above, a vehicle request may include data indicative of one or more additional attributes of the request. In preferred embodiments a vehicle request comprises data indicative of a desired pick-up time, a destination location, one or more driver preference(s), one or more vehicle preference(s), a number of people to be picked up, and/or a desired driver rating. Examples of vehicle preferences include size, model, disabled access, etc. As will be described in more detail below, such data may be used in matching a vehicle to the request. In embodiments, therefore each vehicle request comprises a first location, e.g. pick-up location, and optionally one or more of a second location, e.g. drop off location, pick-up time, driver preference and vehicle preference.

In embodiments in which the server receives a vehicle request from a first device, the first device can be of any suitable and desired form. For example, the first device may be a device having a fixed location, such as a personal computer or other computing resource. The first device may also comprise a device that is arranged to be positioned within a building or at an outdoor meeting point, such as a hotel, bar, restaurant, station or the like, and which typically is associated with only a single pick-up location. In these embodiments the first device has an associated location. In embodiments, the associated location is stored at the server. In preferred embodiments, however, the first device comprises a mobile device, such as a mobile telephone, PDA, tablet computer or the like. In these embodiments the device comprises a mobile device having location determining means arranged to determine a current geographic position of the device. It will be appreciated that while in preferred embodiments, the vehicle requester will be the user i.e. the person wishing to travel in the vehicle, in other cases, e.g. where the request is placed via a first device that is associated with a single pick-up location such as a hotel, etc, the vehicle requester may be different to the intended vehicle user. In other words, the vehicle request is placed on behalf of the intended user. The user therefore refers, herein, to the person wishing to travel in a vehicle.

Thus, in some embodiments the first location comprises a current geographical position of a first device, wherein the first device comprises a mobile device having location determining means arranged to determine the current geographical position of the device. In other embodiments the first location corresponds to a location associated with a first device, the associated location being stored at the server.

The first device is preferably capable of determining the current position of the device, and thus preferably comprises location determination means. The location determining means could be of any type. For example, the first device could comprise means for accessing and receiving information from WiFi access points or cellular communication networks, and using this information to determine its location. In preferred embodiments, however, the first device comprises a global navigation satellite systems (GNSS) receiver, such as a GPS receiver, for receiving satellite signals indicating the position of the receiver at a particular point in time, and which preferably receives updated position information at regular intervals.

In embodiments in which the server is in communication with a second device associated with a vehicle, the second device is capable of accepting a vehicle request submitted by a user, and is thus preferably of a form where it can be carried or transported in a vehicle. The second device may be a portable device, e.g. capable of being handheld, and which, for example, may be removably mounted within a vehicle. In other embodiments, the second device may be an in-vehicle system, i.e. that is permanently mounted within a vehicle.

The second device is preferably arranged to transmit positional data relating to the current position of the device, and thus the vehicle in which is it is associated, to the server. Accordingly, the second device is capable of determining the position of the device, and thus comprises location determination means. The location determining means could again be of any type. For example, a second mobile device could comprise means for accessing and receiving information from WiFi access points or cellular communication networks, and using this information to determine its location. In preferred embodiments, however, the second device comprises a global navigation satellite systems (GNSS) receiver, such as a GPS receiver, for receiving satellite signals indicating the position of the receiver at a particular point in time, and which preferably receives updated position information at regular intervals The second device preferably also includes means for determining the relative displacement of the vehicle in which the device is carried, thereby allowing, for example, the speed and driving direction of the vehicle at any point in time to be determined. The means could comprise the GNSS receiver described above, one or more electronic gyroscopes or accelerometers in the device, or the device could have access to such sensors in the vehicle itself, e.g. using the vehicle CAN bus.

Accordingly, in preferred embodiments, the second device that is utilised in the present invention comprises a navigation apparatus, such as portable navigation device (PND) that can be removably mounted within a vehicle or an in-vehicle navigation system, and which preferably includes GNSS signal reception and processing functionality. It will be appreciated, however, that the second device may also comprise a mobile telephone, PDA, tablet computer or the like running suitable software programs.

The positional data relating to a vehicle, e.g. a second device associated therewith, may be transmitted to the server in any suitable form that is representative of the position of the vehicle, e.g. second device. For example, the positional data may comprise a pair of longitude and latitude coordinates, or it may comprise a location reference to a feature within a digital map, e.g. with respect to a road junction. As will be appreciated, the positional data is preferably associated with temporal data, e.g. a timestamp, representative of the time at which the positional data is generated at the vehicle or second device. The positional data is preferably transmitted to the server from the vehicle or second device at regularly intervals, e.g. at least every 5 minutes, and preferably at least every minute, or in some cases even more frequently. The server can therefore determine the current position of the second device at a particular point in time from the received positional data to a high degree of accuracy.

The server of the present invention may further comprises data storage means having digital map data stored therein. The digital map data has a plurality of navigable segments representing segments of a navigable route in a geographical area covered by the map, and can thus be used for route planning and navigable purposes. For example, in the present invention, the digital map data is used to calculate a route between the first location and a destination location which is to be travelled by a vehicle.

In the present invention, the server is arranged to receive a vehicle request comprising at least a first location, e.g. a pick-up location. The vehicle request is preferably received from a first device. The first location may be generated in any suitable manner. For example, the location may be input directly by the user on a user interface of a first device. This would be the case, for example, if the user wanted to be picked-up by a vehicle at a different location from their current location. In a preferred embodiment, however, the first location is generated at the first device using the device's location determination means. As will be appreciated this would typically be the case if the user wants to be picked-up by a vehicle at their current location.

The present invention is, as discussed above, particularly applicable to "immediate" fulfilment type requests, in which vehicle requests are made for a vehicle to be provided as soon as possible. However, the present invention is also applicable to so-called "scheduled" vehicle requests, in which requests are made for a vehicle to be provided for a specified future time, or to systems involving a combination of immediate and scheduled vehicle requests.

In preferred embodiments the step of generating the one or more clusters uses time data associated with each received vehicle request. The time data may comprise data that is already associated with the request upon receipt by the server e.g. for a scheduled request, and/or data that is associated with the request by the server upon receipt of the request. Preferably the time data used in generating the one or more clusters is at least data indicative of a time of receipt of the vehicle request at the server. This may be the case for scheduled or immediate type requests. Alternatively or additionally the time data used may be indicative of a desired pick up time associated with the request. This may be particularly applicable to scheduled requests.

Preferably, whether or not the data is used in generating the one or more clusters, the method further comprises a step of the server associating data with each received vehicle request indicative of a time of receipt of the request at the server. The server may comprise processing means for carrying out such a step. This may be carried out regardless of whether a request is an immediate request or a scheduled request. The data indicative of the time of receipt of the vehicle request that is assigned to each vehicle request by the server may be directly or indirectly indicative of the time of receipt. The data may be a time of receipt. In other embodiments the data may comprise an identification number, e.g. relating to a temporal ordering of requests.

In preferred embodiments each vehicle request of at least a first set of vehicle requests is allocated to a cluster upon receipt at the server. This may be most appropriate for "immediate" type requests. Thus the first set of requests may be a set of requests for immediate fulfilment. Where scheduled requests are involved, the method may comprise generating the one or more clusters, e.g. allocating such requests to a cluster based upon a time a predetermined amount in advance of the desired pick-up time, e.g. 30 minutes before pick up time. In some embodiments the method may comprise allocating each vehicle request of at least a second set of vehicle requests to one or more cluster a given time after receipt at the server, preferably wherein the time is based upon a desired pick-up time associated with the request e.g. a predetermined amount of time in advance of the pick-up time. The second set of request may then be a set of scheduled requests for fulfilment at a specified future time. In other arrangements, scheduled type requests could be treated separately to "immediate" type requests e.g. being allocated to a separate set of clusters, or could be handled individually.

In accordance with the invention, the method comprises the server carrying out the step of generating one or more clusters each comprising a plurality of the vehicle requests. Matching of vehicles to vehicle requests is then carried out within each cluster. In embodiments the method comprises completing a given generated cluster before matching of a vehicle to a request is carried out for any of the requests which define the cluster. Each received request is allocated to a given cluster before a vehicle is matched to the request.

A "cluster" is a group of vehicle requests that will be processed together when the step of matching vehicles to requests is carried out. By assigning vehicle requests to clusters and then carrying out matching on a per cluster basis, the present invention provides the ability to dynamically balance the time that the system waits to receive a given number of vehicle requests before carrying out matching, which is advantageous in being able to take an overview of supply and demand, and assists in optimising matching, with avoiding excessive waiting time for individual users. A cluster comprises a group of a plurality of vehicle requests that have been allocated to the cluster for matching vehicles to the requests. The step of generating a cluster refers to the process of building up a group of vehicle requests that are to be treated as a cluster for the purposes of the present invention. The method may involve creating an association between the vehicle requests that are included in a given cluster.

In embodiments, the method of the present invention comprises generating the one or more clusters comprising a plurality of the vehicle requests using at least time data and/or the first location data associated with each request.

In general, in accordance with the invention, preferably the step of generating the one or more clusters takes into account a geographical distribution, e.g. a spatial density of the plurality of vehicle requests and/or of the vehicles. The geographical distribution of the plurality of vehicle requests is determined using a location associated with each vehicle request. Preferably the geographic distribution of the vehicle requests is determined using the first location data associated with the requests. The first location data is preferably indicative of a pick-up location as set out above. Of course, the geographical distribution might alternatively or additionally be determined using another location associated with a vehicle request e.g. a drop-off location. The use of a pick-up location is preferred as this is most relevant to matching available vehicles to vehicle requests in a manner that optimises waiting time. The geographical distribution of the vehicles in a region may be determined based on the current location data for the vehicles. In particularly preferred embodiments the step of generating the one or more clusters takes into account a geographical distribution, and preferably a spatial density, of the vehicles. It has been found that taking into account a geographical distribution of vehicles is useful in generating clusters, as the spatial density of vehicles available for fulfilling vehicle requests will influence the extent to which vehicle requests in respect of spaced apart locations, e.g. pick-up locations may be considered together for matching purposes. If the spatial density of vehicle is high, the likelihood is that there will be a vehicle in proximity to a given pick-up location, so a cluster may be built up from vehicle requests relating to relatively closely spaced locations, e.g. pick-up locations. As the requests in a cluster will be matched as a group to vehicles, there is no benefit in considering requests relating to locations at a greater distance, as it is unlikely that a vehicle will be a good match for such trips as well as those for the more closely spaced locations.

Preferably the step of generating the one or more clusters alternatively, or preferably additionally, takes into account a temporal distribution of the plurality of vehicle requests.

Preferably a plurality of clusters are generated, each comprising a plurality of vehicle requests. In preferred embodiments a plurality of clusters are generated simultaneously. Each generated cluster may then be passed to a matching stage once considered "complete". These arrangements provide the opportunity to generate clusters simultaneously in respect of different criteria e.g. in respect of requests that may be considered related with respect to certain attributes, which may be geographical or otherwise, as described below. References to "generating" a cluster refer to the step of adding vehicle requests to the cluster or creating a cluster from a plurality of existing clusters, e.g. merging clusters. This may be up until the time at which the cluster is considered "complete", and ready for matching. The cluster is initiated when the first vehicle request is allocated thereto, i.e. when the vehicle request is used to start a new cluster rather than being added to an existing cluster or clusters.

The step of generating a cluster may comprise associating data indicative of a given cluster with each one of a set of a plurality of vehicle requests that are to define the cluster. Thus, each of the vehicle requests for a given cluster is associated with data indicative of the request belonging to the given cluster. The data indicative of a cluster may be of any type provided that it identifies the cluster to enable vehicle requests associated with the cluster to be processed together when vehicle matching occurs. The data indicative of a cluster identifies requests as forming part of a group for the purposes of matching.

It will be appreciated that in generating the one or more cluster of vehicle requests each received request must be allocated to a cluster. Preferably a vehicle request is allocated to a given cluster upon receipt at the server. However, as set out above, for scheduled requests, allocation to a cluster may occur at a given time with respect to a desired pick up time.

In embodiments the method comprises the step of allocating each received vehicle request to a given cluster. The step of allocating a given request to a cluster may comprise allocating the request to a given one of a set of one or more, and preferably a plurality of, existing clusters, or using the request to generate a new cluster. Using a vehicle request to generate a new cluster may comprise using the vehicle to initiate the cluster, or adding the request to a cluster which is created by merging a plurality of existing clusters. The method may therefore involve determining whether a received vehicle request is to be added to an existing cluster, and if so, to which, or whether a new cluster should be generated using the new request to which to add the new request, and if so whether the request is to initiate a new cluster or be used to create a new cluster by merging a plurality of existing clusters. In some embodiments the method may comprise determining to which one of a plurality of existing clusters a received vehicle request is to be allocated.

In embodiments the method may comprise determining whether to allocate a given received request to an existing cluster or to generate a new cluster and allocating the request to the new cluster based at least on data indicative of a time and/or first location associated with the request.

In preferred embodiments, the step of determining whether a received vehicle request is to be added to an existing cluster or to be used to generate a new cluster comprises assessing the extent to which the received vehicle request is related to one or more vehicle requests of one or more existing cluster based on one or more relationship measures. The method may comprise determining whether a received vehicle request is considered to be related to one or more of the existing requests of one or more existing cluster based on one or more relationship measures. In embodiments the method comprises adding a received vehicle request to an existing cluster when the received request may be considered to be related to one or more of the existing requests of the cluster based on one or more relationship measures. The method may comprise using a received vehicle request to initiate a new cluster when the vehicle request is not considered to be related to any of the existing requests of an existing cluster based on the one or more relationship measures. The method may comprise adding the vehicle request to a new cluster created by merging a plurality of clusters when it is determined that a received vehicle request may be considered to be related to one or more of the existing requests of each of the plurality of clusters.

By generating clusters in this way, by first considering a relationship between a received vehicle request and an existing request or requests of one or more cluster or clusters before it can be added to an existing cluster, or to a new cluster created by merging multiple existing clusters, it is possible to generate clusters of vehicle requests that are considered related according to the one or more relationship measures. This may facilitate matching of vehicles to the requests, as it may be assumed that a similar set of vehicles, or even the same set of vehicles, may be used to service the requests. Thus, different sets of drivers may be used to service different clusters, making the matching process simpler. The merging of clusters where vehicle requests are related to existing requests of multiple clusters may further consolidate the clusters and relatedness of their requests.

In general in preferred embodiments the method comprises generating one or more, and preferably a plurality of clusters, wherein the vehicle requests associated with each cluster are considered to be related to one another based on one or more relationship measures.

It will be appreciated that the methods of the invention may involve determining that a vehicle request may be considered to be related to one, or more than one, of the existing requests of an existing cluster or clusters before it may be added to the cluster, or to a new cluster created by merging existing clusters. The number of existing requests of the or each cluster to which a new request must be related in order to be added to a cluster or to a new cluster created by merging clusters, and the closeness of the relationship required, may be set as desired to result in clusters containing requests of a given level of relatedness. As described below, in preferred embodiments the degree of relatedness required may be dependent upon one or more of a temporal distribution of vehicle requests, a geographical distribution of vehicle requests or a geographical distribution of vehicles in a geographical region based on a location or locations with which the or each cluster is associated.

In preferred embodiments the one or more relationship measures are associated with the cluster. In embodiments, therefore one or more relationship measures are associated with the or each cluster for use in determining whether a new request is related to one or more existing requests of the cluster. The method may extend to the step of defining one or more relationship measures, and associating the or each relationship measure with the cluster or clusters. The relationship measure(s) may be of any suitable type. A relationship measure may be indicative of a relationship threshold to be met.

In preferred embodiments the one or more relationship measures include at least a measure indicative of a geographical relationship, e.g. a geographical relationship threshold. For example, a measure indicative of a geographical relationship may be indicative of a range requirement to be met by a location, e.g. the first location associated with a vehicle request in order for the request to be considered related to one or more existing vehicle requests of the cluster. The geographical relationship measure may be by reference to a pick-up location of the request, a destination location or any suitable geographical location or locations. As discussed above, in embodiments, the first location associated with a given vehicle request may be a pick-up location, destination location or similar, and is preferably a pick-up location. Preferably the geographical relationship measure is by reference to a pick-up location. In some preferred embodiments the geographical relationship measure is indicative of a range within which a location, e.g. a pick-up location, associated with a vehicle request must lie in order for the request to form part of the cluster. The range may be with respect to a corresponding location, e.g. a pick-up location, associated with a given one or ones of the existing requests of the cluster (such as the pick-up location of the vehicle request that initiated the cluster). The corresponding location may be the centroid (or geometric centre) of the cluster. The method may therefore comprise assessing the extent to which a received vehicle request is related to one or more vehicle requests of an existing cluster based on the measure of a geographical relationship using the first location data associated with the vehicle request. In some preferred embodiments a geographical relationship measure is indicative of a maximum range within which a pick-up location associated with a vehicle request must lie relative to a pick-up location associated with one or more existing requests of the cluster.

In other embodiments a relationship measure may additionally or alternatively be used that is indicative of a non-geographical relationship. For example, a relationship measure may be indicative of a relationship based on one or more criteria, e.g. time, vehicle type, vehicle size, whether a vehicle is required that accepts pets, etc. The criteria are with respect to data associated with the or each vehicle request. Thus, in order to base a relationship determination on vehicle size, at least some vehicle requests would need to specify a desired vehicle size. A time criterion might be in relation to a desired pick-up or drop-off time. This may be particularly relevant to scheduled requests. A measure may require that the pick-up or drop-off time of a request is within a given time range of a corresponding pick-up or drop-off time of a request of the cluster. Time data, e.g. a pick-up time, associated with a request may be used to determine whether a request may be considered related to the request(s) of an existing cluster based upon the one or more measures.

It will be appreciated that multiple relationship measures may be taken into account, and, if appropriate desired weighting with respect to different measures achieved, using suitable functions based on different relationship measures.

In preferred embodiments the one or more relationship measures used to assess the relationship between a vehicle request and one or more existing vehicle requests of an existing cluster are defined based upon one or more of: a geographical distribution of the vehicle requests determined using locations associated with the vehicle requests in a geographical region based on one or more locations associated with the cluster; a geographical distribution of the vehicles based on the current location data of vehicles in a geographical region including one or more locations associated with the cluster; and a temporal distribution of vehicle requests in a geographic region including one or more locations associated with the cluster. Preferably the geographical distribution is a spatial density. In preferred embodiments the method comprises defining the one or more relationship measures based upon one or more such geographical and temporal distributions. In these, and any embodiments in which a geographical distribution is determined using location associated with vehicle requests, the locations may be first locations, e.g. pick-up locations. The geographical distribution or temporal distribution of vehicles or requests may be time dependent. Thus, the relationship measure(s) may be defined based on the geographical distribution or temporal distribution of requests or vehicles for a relevant time period.

By generating clusters in this manner, it is possible to control the density and size of clusters generated. For example, for a cluster associated with a relatively busy region, i.e. where there is a high spatial density of vehicles or vehicle requests, by setting the relationship measures to require a closer relationship between a new request and an existing request(s) of the cluster in order for the request to be added to a cluster in the region or to a new cluster formed by merging the cluster with another cluster(s), more clusters will tend to be generated, with relatively smaller geographical spread of locations e.g. pick-up locations associated with requests in the cluster. Conversely, for a cluster associated with a less busy region, where a less close relationship may be required for a request to be added to a cluster, fewer clusters may be generated, including requests associated with locations spread over a greater geographic region.

The method may comprise varying the one or more relationship measures associated with a cluster in dependence upon any one or more of the above factors. The method may comprise varying the one or more relationship measures in dependence upon a variation in a temporal distribution of vehicle requests made over time in a geographic region based on one or more location associated with a cluster. The method may comprise associating different relationship measures with different clusters depending on a temporal distribution of vehicle requests in a geographical region based on one or more location associated with each cluster. The temporal distribution of the requests refers to the number of requests made per unit time. Thus, when a cluster is associated with a location in a geographic region where relatively few vehicle requests are made per unit time, the one or more relationship measures may be defined differently to those associated with a cluster associated with a location in a geographic region where relatively many vehicle requests are made per unit time i.e. a relatively busy region. Similarly where the temporal density of vehicle requests in a geographic region based on a location or locations associated with a cluster changes, the one or more relationship measures may be varied.

Alternatively or additionally, the method may comprise varying the one or more relationship measures in dependence upon a variation with respect to time of a geographical distribution of locations associated with vehicle requests and/or a geographical distribution of vehicles in a geographic region based on one or more location associated with a cluster. The method may comprise associating different relationship measures with different clusters depending on a geographical distribution of locations associated with vehicle requests and/or a geographical distribution of vehicles in a geographical region based on one or more location associated with each cluster. The one or more measures are preferably varied based upon a variation with respect to time of a spatial distribution of the locations associated with vehicle requests and/or vehicles in a geographical region based on one or more locations associated with the cluster. Thus, when a cluster is associated with a location in a geographic region in which vehicle requests are associated with relatively widely spatially distributed locations, or in which region vehicles are relatively widely spatially distributed, the one or more relationship measures may be defined differently to those associated with a cluster associated with a location in a geographic region where a spatial density of locations associated with vehicle requests or vehicles is relatively high, i.e. a relatively busy region. Similarly where the spatial density of locations associated with vehicle requests or vehicles in a geographic region associated with a cluster changes, the one or more relationship measures may be varied.

A geographical region based on a location or locations associated with a cluster may be of any desired extent. The location or locations associated with the cluster included in the region are preferably locations associated with one or more of the vehicle requests of the cluster. The locations are preferably first locations, and most preferably are pick-up locations. It will be appreciated that for brevity, the geographical region may be described herein as being "associated" with a cluster. The geographical region may include the or each location, or may be otherwise based thereon. For example the region may be centred on a location, or on a location determined using a plurality of the locations. The region may be of any suitable size. It will be appreciated that the region is based on one or more locations associated with a cluster. Thus, as the cluster changes, e.g. grows as more requests are added, the definition of the region may change. In some arrangements the region may be based on a location e.g. pick-up location associated with a request first added to a cluster. By choosing the region appropriately, a given level of resolution of the system may be achieved, taking into account local variation in e.g. spatial or temporal density of requests or vehicles, rather than assuming a global level of "business" of the system.

The region is preferably an extended region. The geographical region may be of any size depending upon the extent to which relatively local variation in temporal request distribution is to be taken into account. For example, a geographical region may be a district, city, region of a country, country, etc. In some embodiments a geographical region may correspond to a centre or outskirt region of a city. A specific geographical region may be defined for each cluster, or a cluster may be determined to be associated with a given one of a set of predefined geographic regions based on the one or more locations. In the former case, a geographical region might be defined in terms of a given range from a pick-up location associated with one or more requests of the cluster, or from a point that is considered the centre of the locations associated with multiple requests.

The region could be defined in the same way for any location or locations associated with a cluster, or alternatively the geographical area may be defined in dependence on the location or locations. It is envisaged that the extent of geographic regions may be defined based upon a temporal and geographical distribution of vehicle requests or vehicles over a geographic area, in embodiments, for a given time. Thus an area may be divided into geographic regions based on the temporal density of vehicle requests of different portions thereof, and each cluster may then be associated with a one of the regions, e.g. based upon a first request of the cluster being associated with a location e.g. pick-up location being within the region. The geographical regions may respectively encompass locations having similar temporal densities of vehicle requests or vehicles. Different geographical regions may be associated with "low" and "high" temporal densities of requests or drivers, or any number of intervening levels of temporal density. For the avoidance of doubt, the above statements regarding the definition of a geographical region based on one or more locations associated with a cluster are equally applicable to embodiments below in which a threshold used to assess completeness of the cluster is based upon a temporal distribution of requests in a geographic region based on one or more locations associated with the cluster.

In accordance with the invention, matching of a vehicle to a, or each, vehicle request is carried out only after the request has been allocated to a given cluster. The method may comprise matching vehicles to vehicle requests of a first cluster, and then matching vehicles to vehicle requests of a second different cluster. It will be appreciated that a determination has to be made as to when to start matching vehicles to vehicle requests of a given cluster. In other words, it must be determined when a cluster can be considered to be "complete" such that the vehicle requests of the cluster are ready for matching. In accordance with the invention, matching of a vehicle to a vehicle request does not occur in respect of any of the vehicle requests forming a given cluster until the cluster is considered complete. When a cluster is complete, no further vehicle requests may be added to the cluster.

The vehicle requests of a cluster may be subjected to a matching process at any time once the cluster is considered complete. The matching process may be carried out immediately the cluster meets one or more requirements used to assess when the cluster is considered to be in a "complete" state, or at some point soon thereafter. For example, clusters may be regularly polled to identify those clusters which are considered complete and ready for matching.

The method may comprise determining that a cluster may be considered complete by reference to one or more measures indicative of the completeness of the cluster. In accordance with the preferred embodiments of the invention, the method comprises determining when a cluster is considered to be complete, such that no further requests may be added to the cluster, by reference to one or more thresholds. The one or more thresholds may include a threshold in relation to a number of vehicle requests comprised by the cluster and/or a time related threshold. Preferably both a time related threshold and a threshold in relation to the number of requests is used. In some embodiments a cluster is considered to be complete when either one of first and second thresholds are met or exceeded; the first threshold being a threshold in relation to a number of vehicle requests comprised by the cluster, and the second threshold being a time related threshold. A threshold in relation to a number of requests is preferably a maximum threshold. Thus, this threshold may set a maximum size of a cluster in terms of the number of requests it contains. A time related threshold is preferably a maximum threshold. In these embodiments both time related and number of request related thresholds are associated with a cluster.

In some preferred embodiments a time related threshold is based on an elapsed time since a first clustered one of the vehicle requests of the cluster was added to the cluster. It will be appreciated that the vehicle request may have initially been clustered by adding it to a different cluster that was then merged with one or more other clusters to create the cluster. In this case, the elapsed time is with respect to a time at which the request was first added to any cluster. In other embodiments the first clustered vehicle request may have been first clustered upon creation of the cluster in question. Thus the elapsed time may be with respect to the time of generation of the cluster. The elapsed time may be based on any suitable time data indicative of the time at which at the first clustered request was clustered. The time data may be a clustering time associated with a request or a generation time of the cluster. In some embodiments the time data is a time of receipt of the request at the server. Where requests are added to clusters upon receipt, such a time may be considered indicative of a first clustering time of the request.

By specifying thresholds in relation to both time, and a number of vehicle requests included in the cluster which are used to determine when a cluster may be considered to be complete, such that no further requests may be added to it, and the requests of the cluster are ready for matching, the present invention provides a dynamic way of generating clusters such that a balance is maintained between waiting long enough before carrying out matching to provide sufficient requests to allow more optimal matching to be achieved, while avoiding excessive waiting times for user.

For example, if a threshold were set by reference only to a number of requests present in the cluster, then, for a cluster relating to a geographic region with relatively few vehicle requests per unit time, it would be necessary to wait much longer before a cluster could be considered complete, and subjected to matching, than would be the case for a cluster relating to a busier geographic region, with relatively large numbers of vehicle requests per unit time. Conversely, if a threshold were set by reference only to an elapsed time since addition of a first request to a cluster, then, for a cluster in a geographic region with a low density of vehicle requests per unit time, matching would need to be carried out in relation to a cluster with relatively few vehicle requests in comparison to a cluster in a busier region. By determining completeness of a cluster by reference to either of a time related and number of request based threshold being met, a balance is met between these situations. The methods of the present invention in these preferred embodiments may therefore take account of a varying temporal distribution of vehicle requests with respect to a geographical region.

The or each threshold used in determining when a cluster may be considered to be complete may be determined in any suitable manner. A time or number based threshold may be determined based upon a minimum requirement for responsiveness required. By choosing a relatively low number threshold, the system will be more responsive, i.e. matching will occur more quickly, when conditions are busier. A time related threshold may be used to determine the time at which matching occurs in less busy regions where the number region is not first met, and thus a lower time threshold will result in a more responsive system. The threshold(s) may be set globally and may be independent of the spatial or temporal distribution of vehicle requests in a geographical region associated with a cluster.

In other arrangements it is envisaged that the or each threshold may be selected based upon a temporal and/or geographical distribution of vehicle requests, preferably in a geographic region associated with the cluster. The geographical distribution is preferably a spatial density. The geographic region may be defined in any manner as described above in relation to the embodiments in which the relationship measures are used to determine the similarity of a request may be added to an existing cluster.

In general, the higher the number of vehicle requests matched at once i.e. the larger the size of the cluster, the more optimized the matching will be. However, in practice it is not possible to wait for an excessive amount of time, as this will introduce unacceptable delay to users. It will be appreciated that where a high temporal density of requests is received, i.e. at busy times, it may be possible to increase significantly the number of requests in a cluster, and hence matching efficiency, at the cost of only a modest increase in time. Thus, where temporal densities of requests are high, then the maximum size and/or time threshold may be increased without significantly increasing waiting times for users. On the other hand, when temporal densities are low, i.e. at quiet times, waiting a significantly longer time before performing matching for a cluster will have limited impact on matching efficiency, as few additional requests can be expected over the additional period. Thus, where temporal densities are low, it may be detrimental to increase the time or size thresholds. The inventors have realised that the temporal density of requests may vary with respect to geographical area. Thus preferred embodiments of the invention take into account a temporal distribution of requests for a given geographical area associated with the cluster. This may enable local variation in temporal distribution of requests to be accounted for, rather than assuming a global temporal distribution.

In some preferred embodiments a relatively higher maximum size threshold for a cluster is used where a relatively higher temporal density of vehicle requests is associated with a geographic region based on one or more locations associated with a cluster and/or a relatively lower maximum size threshold for a cluster is used where a relatively lower temporal density of vehicle requests is associated with a geographic region based on one or more locations associated with the cluster. Alternatively or additionally a relatively higher maximum time threshold for a cluster is used where a relatively higher temporal density of vehicle requests is associated with a geographic region based on one or more locations associated with the cluster and/or a relatively lower maximum time threshold for a cluster is used where a relatively lower temporal density of vehicle requests is associated with a geographic region based on one or more locations associated with the cluster.

In preferred embodiments the methods for determining when a cluster may be considered complete are used in combination with the methods for determining whether a request can be added to an existing cluster based on one or more relationship measures described above. It has been found that by using a combination of these methods, i.e. by considering relatedness of requests when generating clusters, and time and size thresholds when considering completeness of thresholds, and taking into account a temporal distribution of requests in geographical regions associated with each cluster, it is possible to control the way in which clusters are generated and completed in busier and less busy regions, and, in embodiments, the largest possible clusters of related trips may be generated in geographical regions that are less busy given the constraint imposed by a maximum time threshold before matching of the cluster may occur, i.e. a latency, and sufficiently large clusters of related trips as dictated by a maximum size threshold for providing more optimal matching may be generated in busier areas with the smallest possible time before matching occurs.

By way of example, if both time and quantity of vehicle requests thresholds are used, the result will be that clusters will tend to be considered complete based upon meeting or exceeding the quantity based threshold in busier regions, e.g. city centres, while in quieter regions in the outskirts of the town clusters will tend to be considered complete based upon meeting or exceeding the time based threshold. In other words, a relatively larger number of smaller clusters will tend to be generated in the busier regions, while a relatively smaller number of larger clusters will tend to be generated in the quieter regions.

Matching may be carried out in relation to the requests forming part of a cluster in any suitable manner. In embodiments the step of matching a vehicle to each vehicle request of a cluster is carried out by reference to each other vehicle request of the cluster. Thus, rather than considering a single request at a time, and allocating a most appropriate vehicle (from all available vehicles) based on one or more criteria, matching is carried out globally to achieve the most optimal match over the requests of a cluster as a whole. Preferably a single vehicle is matched to each request of a cluster. Preferably each vehicle is matched to only one request. The step of matching vehicles to requests may comprise the server analysing the content of each received vehicle request of the cluster, and determining the criteria associated with the vehicle request. The step of matching a vehicle to a vehicle request may comprise matching a second device, from a plurality of available second devices, to the received vehicle request. The server may be arranged to make this selection in any suitable and desired manner as described below.

It will be appreciated that in preferred embodiments, the vehicle requests associated with a given cluster are, in some manner, related to one another. This may facilitate the task of matching vehicles to the requests. In preferred embodiments the requests are related at least geographically, preferably in relation to the first locations, e.g. pick-up locations associated, with the requests. The requests may also be related by reference to one or more other criteria taken into account when allocating the requests to the cluster, e.g. in relation to one or more driver preferences, vehicle preferences, number of people to be carried, pick-up time, drop-off time, etc.

The matching may be based on one or more criteria relating to one or more attributes of each vehicle request of the cluster, and preferably at least a location associated with each vehicle request of the cluster, e.g. a pick-up location. However, other criteria may additionally or alternatively be taken into account including user specified criteria. The criteria may alternatively or additionally comprise criteria in respect of one or more of: at least one vehicle preference, at least one driver preference, a driver rating, data indicative of a desired pick-up time, data indicative of a number of people to be picked up. It will be appreciated that a "preference" as referred to herein may be indicative of a desire that is positive or negative, i.e. for something to be the case or not to be the case.

It will be appreciated that the matching process is described by way of matching a vehicle to a vehicle request. A vehicle has an associated driver, and references to driver preferences, etc refer to the driver of a vehicle to potentially be allocated to a vehicle request. Where a given vehicle may be associated with multiple drivers, references to the driver will relate to the current driver, or the driver expected (or known) to be using the vehicle at the relevant time, e.g. pick-up time.

The step of matching a vehicle to each vehicle request of a cluster preferably comprises determining a set of vehicles suitable for fulfilling the requests of the cluster based on one or more criteria. The set of vehicles may be a subset of the plurality of vehicles. The vehicles are vehicles which are known to the server to be available for fulfilling requests. The criteria preferably include at least one geographical criteria. The criteria preferably comprise a criteria in relation to distance between a current position of a vehicle and a location or locations based on one or more locations associated with the cluster, preferably wherein the location or locations upon which the location(s) are based is/are first locations associated with requests of the cluster. The location(s) are preferably pick-up locations of one or more of the requests of the cluster. The location or locations based on the one or more locations associated with the cluster may correspond to the locations, or otherwise be determined based on the location(s), e.g. being a centre determined with respect to the location(s), etc. Preferably, for the or each location based on the location(s) associated with the cluster, the server defines a geographical area containing the respective location. The geographical area could be defined in any suitable and desired manner. For example, the area could be a circle centred at the location and having a predetermined radius, such as a distance of between 50 to 500 meters, preferably about 250 meters. The area could be defined the same way for any location, or alternatively the geographical area may be defined in dependence on the location. The determined set of vehicles may be vehicles within the area.

The criteria may additionally or alternatively comprise criteria in respect of one or more of: at least one vehicle preference, a driver rating, at least one driver preference, data indicative of a desired pick-up time, and data indicative of a number of people to be picked up. The criteria may comprise user criteria. The server may determine the availability of vehicles for fulfilling vehicle requests in any suitable manner. For example, the server may receive continual, e.g. periodic, updates of the position and status of each of a plurality of vehicles having a second device, and which have the potential of meeting a received vehicle request. Some vehicles may, for example, be unavailable to meet a received vehicle request, e.g. because a vehicle may be completing a previous journey, or the driver of a vehicle may alternatively be taking a rest. The server is therefore aware of the vehicles that are available at a particular moment in time to accept a received vehicle request, in addition to the current position of the vehicle. Furthermore, and if a vehicle request is in relation to a predetermined time in the future—in contrast to a vehicle request from a user indicating that they would like to be picked-up immediately—the server is aware of the position and availability of vehicles at that future time, based on journeys that the vehicles may already be undertaking.

The step of matching the vehicles to vehicles requests may then comprise matching vehicles from the determined set of vehicles to the set of vehicle requests of the cluster. In some embodiments the method may comprise matching the vehicles to vehicle requests in a manner to minimise estimated time of arrival of the vehicle at a first or pick-up location associated with each request. It will be appreciated that the term "minimise" refers to minimising subject to any other constraints imposed by one or more other criteria. This is most appropriate for "immediate" type requests, which, are typically those to which the clustering methods described herein may be applied. As discussed above, a scheduled request may be clustered a given time before a desired pick-up time specified, by which time it may be considered an immediate request. However, in the event that a cluster were to be based upon only scheduled requests, the cluster may be based on requests with similar specified pick-up times, such that it will still be beneficial to try to minimise estimated time of arrival among the requests of the cluster.

It is recognised that time of arrival is not the only factor that is important to users, whether in relation to immediate or scheduled requests, and in some cases a user may prefer to wait longer for a vehicle to arrive, if the vehicle meets certain other criteria. Alternatively or additionally, one or more other criteria may be taken into account when matching vehicles to vehicle requests. The other criteria may include preferences of vehicle drivers. This may provide matching which balances the preferences of users and drivers. The matching step may also take into account system preferences, such as preferences based on historical performance of drivers, or other preferences based on the operation of the system as a whole. For example, the step may favour providing more reliable drivers with more profitable trips. The criteria may take into account historical driver or user behaviour. Historical driver behaviour may relate to historical driving style, e.g. whether aggressive or sedate. Historical user behaviour may relate to a previous trips taken, historical preferences expressed, etc. Historical user behaviour may relate to user specified preferences or preferences inferred from previous trips. In embodiments data indicative of historical user and/or driver behaviour may be stored for use in the matching process. The identity of a user or driver may be indicated by a first device associated with a vehicle request, or a second device associated with a vehicle.

In preferred embodiments the method comprises matching vehicles from the determined set of vehicles to the set of vehicles of the cluster based on estimated time of arrival of the vehicle at a first or pick-up location associated with request and/or one or more further criteria, preferably including one or more of: user criteria, driver criteria, vehicle criteria, system criteria, and criteria based on historical driver behaviour and historical user behaviour. Preferably the matching is based at least on the estimated time of arrival. The user criteria may be selected from one or more driver preferences, one or more vehicle preferences, a desired drop-off time, or number of people to be carried. Driver criteria may include preferred areas for pick ups or preferred directions of travel. User or driver criteria may be user or driver specified criteria, or may be otherwise determined, e.g. from past behaviour or user or driver profiles, etc.

The method may comprise assigning a match value to each pair of a vehicle and vehicle request of the cluster, and matching vehicles to vehicle requests in a manner so as to maximise the match value between the allocated pairs of vehicles and vehicle requests over the vehicle requests of the cluster. The match value may be a parameter that is a function of the various factors taken into account in the matching process. The match value may be based on estimated time of arrival of a vehicle at a pick-up location for a request and/or one or more of driver preferences, user preferences, historical user behaviour, historical driver behaviour, and system preferences. These may be of any of the types described above. Different factors may be assigned different weight in determining the match value. The weight attributed to estimated time of arrival relative to one or more other factor may be specified by a user and/or driver. The function may be arranged in any manner to balance conflicting preferences.

The method may then comprise offering a vehicle request to the vehicle, i.e. driver to which it has been matched, e.g. to a second device associated therewith. The method may further comprise the server communicating data indicative of each vehicle request to a vehicle to which it has been matched. The server may provide the data to a second device associated with the vehicle. References to offering a vehicle request to a vehicle should be understood and are interchangeable with offering the vehicle request to a driver of the vehicle.

The step of matching a vehicle to a vehicle request preferably comprises matching a single vehicle to each vehicle request. However, it is to be expected that not every vehicle will accept a vehicle request to which it is matched. In some preferred embodiments the method may further comprise allocating at least one alternative vehicle to each vehicle request. In preferred embodiments the vehicles allocated to vehicle requests in accordance with the methods described, i.e. by taking account of all requests in a cluster, may be considered to be primary order vehicles. Preferably a single primary order vehicle is matched to each request. In some embodiments the method further comprises allocating at least one secondary order vehicle to each request of a cluster based on matching a vehicle to the request without consideration of other requests in the cluster. In other words, the secondary order vehicles are matched using conventional techniques. The secondary order vehicle may be a vehicle that is determined to best match the vehicle request based on one or more criteria, which may be as described above. The secondary order vehicle is a lower ranking vehicle for fulfilling the request behind the primary order vehicle. Tertiary (or third) order and any other higher order sets of vehicles, i.e. yet lower rank sets, may be determined being the next best match based on conventional techniques for each request. Preferably a single vehicle is allocated to each vehicle request in each order set of vehicles. In preferred embodiments the method comprises matching a vehicle to each vehicle request of the cluster to provide a set of primary order vehicles for fulfilling the vehicle requests of the cluster, wherein matching of each primary order vehicle to a vehicle request is carried out by reference to each other vehicle request of the cluster, and matching a vehicle to each vehicle request of the cluster to provide a set of secondary order vehicles for fulfilling the vehicle requests of the cluster, wherein matching of each secondary order vehicle to a vehicle request is carried out without reference to any other vehicle request of the cluster. Implementations may be set up as desired, e.g. to control whether the same driver may be allocated multiple vehicle request of a given order, or whether a driver may be allocated vehicle requests in respect of multiple orders, etc. The method may comprise first offering each vehicle request to each allocated primary order vehicle, and, offering a vehicle request to a secondary order vehicle for the request when the primary order vehicle does not accept the request e.g. in a given time.

As will be appreciated, in aspects or embodiments of the invention using first and/or second devices, the first and second devices where used comprise communication means for transmitting information to, and receiving information from, the other components of the system, such as the server. The information may comprise positional data, data to be displayed, route data, etc. The communication means can be of any type as desired. For example, the devices may comprise one or more physical connector interfaces by means of which data signals can be transmitted to and received from the device. In preferred embodiments, however, the communication means comprises one or more wireless transmitters/receivers to allow communication over cellular telecommunications and other signal and data networks, for example WiFi, GSM, GPRS and the like.

As discussed above, in any of the aspects or embodiments of the invention, references to matching a vehicle to a vehicle request may be understood to refer to, and may be interchanged with, references to matching a driver associated with a vehicle to a vehicle request. The matching refers to a given driver that is associated with the vehicle at the relevant time, and thus vehicles and drivers associated with vehicles may be referred to interchangeably.

The present invention extends to a first and/or second device configured to operate with the vehicle request management system in accordance with any of the aspects or embodiments of the invention as described above. Furthermore, although certain steps have been described above as occurring only on the server, it will be appreciated that the steps could be made instead on one or both of the first and second devices if present, or on any combination of the first and second devices and the server, as appropriate.

The methods in accordance with the present invention may be implemented at least partially using software. It will thus be seen that, when viewed from further aspects, the present invention extends to a computer program product comprising computer readable instructions adapted to carry out any or all of the methods described herein when executed on suitable data processing means, such as a server.

The invention also extends to a computer software carrier comprising such software. Such a software carrier could be a physical (or non-transitory) storage medium or could be a signal such as an electronic signal over wires, an optical signal or a radio signal such as to a satellite or the like.

While the invention has been described herein by reference to matching requests for vehicles to available mobile vehicles for fulfilling the requests, it will be appreciated that the invention is applicable in its broader aspects at least to matching service requests to mobile service providers.

It will also be understood by those skilled in the art that all of the described aspects and embodiments of the present invention can, and preferably do, include, as appropriate, any one or more or all of the preferred and optional features described herein.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF THE PREFERRED EMBODIMENTS

The present invention, at least in preferred embodiments, is directed to a vehicle request management system, and in particular to a system for managing the requests for taxis between people and the individual taxis. The architecture for a system in accordance which may be used with the present invention is described with reference to FIG. 1.

Figure 1:
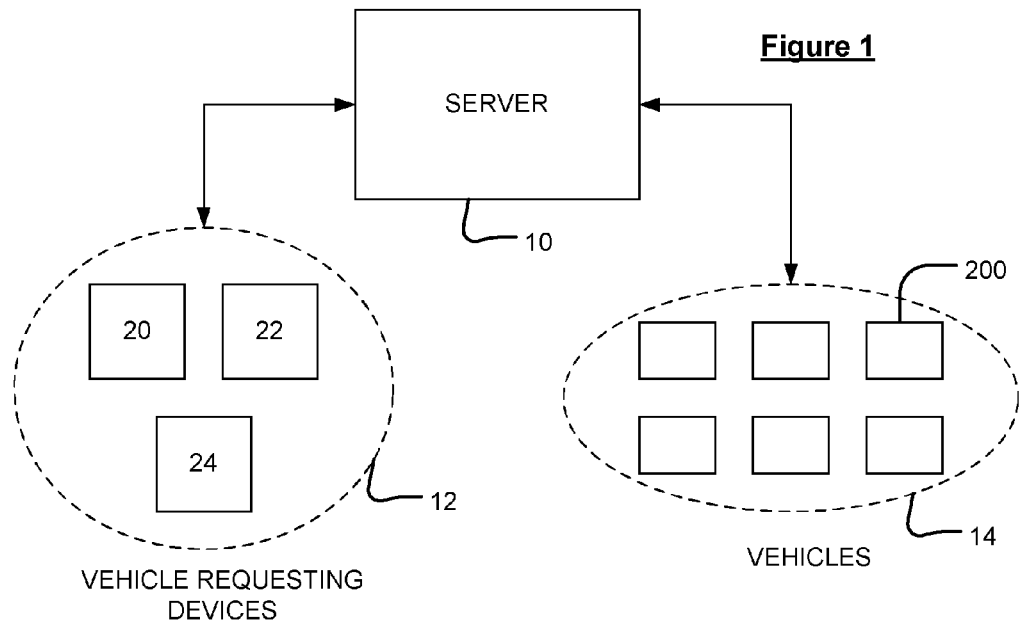
FIG. 1 is an illustration of the structure of a vehicle request management system which may be used in accordance with the present invention.

As shown in FIG. 1, the system comprises three principal components: a server 10; a plurality of vehicle requesting devices 12; and a plurality of vehicles 14, each being equipped with a device 200 having route planning and navigation functionality.

Figure 2:
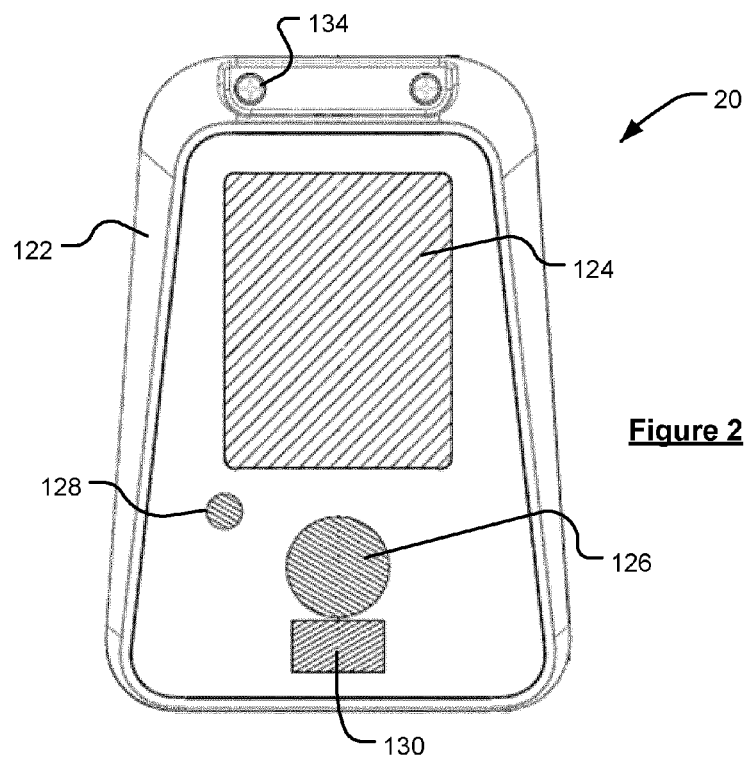
FIGS. 2 and 3 show an exemplary fixed location device that can be used as a vehicle requesting device in the system.
Figure 3:
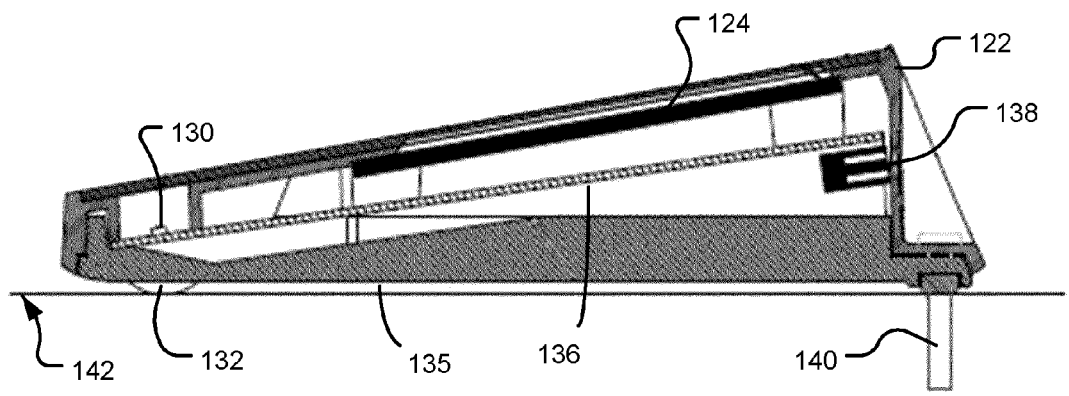

The vehicle requesting devices 12 can be of a number of different forms. For example, the vehicle requesting device could take the form of a fixed location device 20, as shown in FIGS. 2 and 3. A fixed location device, as the name suggests, is associated with only a single location and can only be used to request vehicles to this location. The vehicle requesting device can also take the form of a mobile device 22, such as a mobile telephone. Such mobile devices, as will be discussed in more detail below, are capable of determining their own location and can be used to request a vehicle to their current location, or any other location as desired. The vehicle requesting device can also be a computing resource 24, such as a desktop or portable personal computer, that does not have means for determining its own location, but nevertheless can still be used to request a vehicle pick-up at a particular location.

Each of the vehicle requesting devices 12 can be used by a user to send a request for a vehicle, such as a taxi, to the server 10. The request will typically include a pick-up location, or data that can be used to derive such a location, and may also include at least one of: a pick-up time; a drop-off location; a desired vehicle type or size (e.g. car, minivan, limousine, etc); the number of passengers to be picked-up; and any additional preferences, such as the need for a child seat, the need for disabled access or if a particular driver is desired. The vehicle requests can be transmitted to the server 10 using any suitable communication means, such as the mobile telecommunication network, the Internet, etc.

When a vehicle request is received at the server 10, the server will select a suitable vehicle 14 that meets the criteria set out in the request. The server 10 therefore functions as a dispatching system to dispatch a suitable vehicle based on the user's request.

Figure 4:
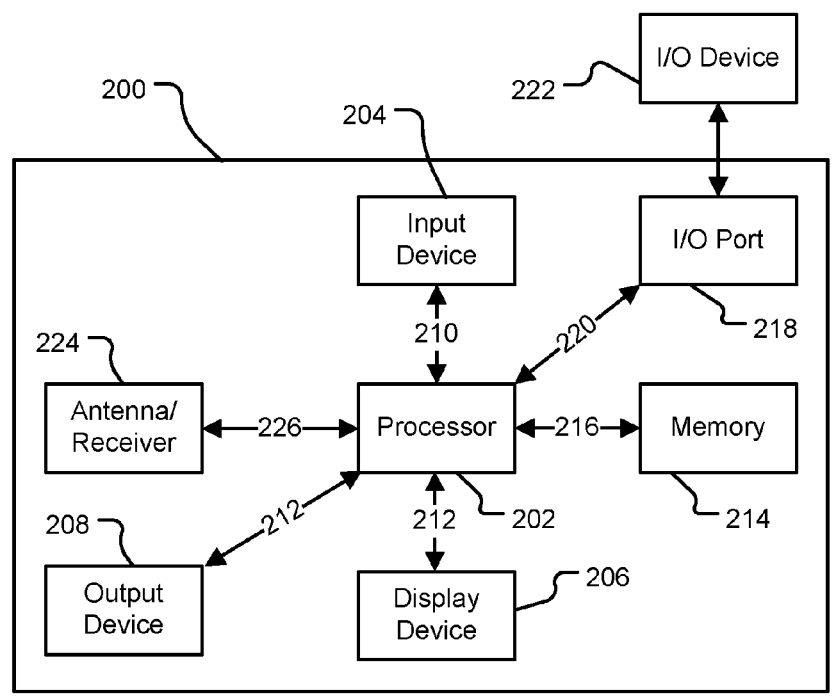
FIG. 4 is a schematic illustration of electronic components arranged to provide a navigation device associated with a vehicle in the system.

The vehicles 14 are each equipped with a device 200 comprising a location determining means and a communication means for communicating with the server 10. The devices in the vehicles can be of any suitable form, but in illustrative embodiments are navigation apparatus. The navigation apparatus can be portable navigation devices (PNDs), which can be removably mounted in the vehicle, or a navigation device that is built into the vehicle. An illustrative representation of a navigation device 200 that can be positioned in one of the vehicles 14 is shown in FIG. 4.

The vehicle devices each transmit their current location, and thus the location of the vehicle, to the server 10 at regular intervals. The server 10 therefore knows the current position of all vehicles within the system at any moment in time, at least to a reasonable degree of accuracy. The server is also aware of the current availability of a vehicle, e.g. whether a vehicle is already in the process of completing a request and whether the driver of the vehicle is unavailable for any other reason. In this regard, each driver may be able to input a range of times at which their vehicle is available to receive requests. Alternatively, the driver can just activate or deactivate the device as desired. The driver may also input certain locations or areas where they will or will not operate.

The server 10 can select a vehicle 14 in response to a particular request, and thus form a temporary association between the requesting device 12 and the device 200 in the vehicle, according to an automatic dispatching system. Systems in accordance with the invention are described with respect to FIG. 11 onward. As will be appreciated, a driver may refuse a job, e.g. through a suitable user-input on their navigation device, even if they are selected by the server 10 as the most suitable.

Once a job has been given to a vehicle, and then accepted by the driver of the vehicle, and in some circumstances also accepted by the user who made the request, then an association is made between the requesting device and the navigation device in the vehicle. This association allows data to be exchanged between the two devices, until such a time as the association is broken, e.g. when the trip has been completed and a payment made.

Once a vehicle has won a job, details of the job are sent to the vehicle's navigation device 200. The details will include the pick-up location, and may also include the details of the person who made the request. The navigation device can automatically, or upon an input by the driver, calculate a route from the vehicle's current position to the pick-up location, and begin guiding the driver to the location. Alternatively, if the vehicle is currently finishing a job, the pick-up location can be temporarily stored in memory until it is needed, or a route can be calculated to the pick-up location using the drop-off location for the current job as a waypoint. Following the calculation of a route, an estimated time of arrival (ETA) at the pick-up location is generated, and this can be supplied to the requesting device 12. An updated ETA can be sent to the requesting device 12 whenever needed, e.g. if the ETA changes as the vehicle travels the calculated route.

Upon picking up the user at the pick-up location, the navigation device 200 of the vehicle 14 will guide the driver to the desired drop-off location. The drop-off location could have been provided by the user in the original vehicle request, or it may be given to the driver by the passenger upon pick-up. Upon arrival at the drop-off location, the passenger will pay for the trip. The payment could be made using cash or by using a credit or debit card, however, preferably the passenger will have an account on the server 10 to which the trip can be assigned thereby allowing payment to be made electronically.

One form that the vehicle requesting devices 12 can take is a fixed location device 20. An example of a fixed location device is shown in FIGS. 2 and 3.

The fixed location device 20 is arranged to be positioned within a building or outdoor meeting point, such as a hotel, bar, restaurant, shopping mall, train station or the like, and be associated with a single pick-up location. The pick-up location may be the device's actual location, or it may be a location in the vicinity of the device, such as the street entrance of the hotel or bar, or the nearest point on the street where a taxi can safely stop.

The fixed location device 20 is configured to allow multiple vehicle requests to the pick-up location associated with the device to be placed, and have more than one of these requests pending at any one time. As shown in FIG. 2, the device 20 has a first button 126 by means of which a user can make a vehicle request. In an embodiment, the button must be pressed for a predetermined period of time, such as 1 second, before a request is triggered. The device 20 also has a second button 128 by means of which a previously made vehicle request can be cancelled. Within a casing 122 of the device 20 is a means for communicating with the server 10. This will typically be a mobile telecommunications module, such as a GSM or GPRS. Additionally, or alternatively, the device 20 may contain a WiFi module, e.g. for areas with limited mobile telecommunications coverage. Such modules are preferably located on a printed circuit board (PCB) 136 within the casing 122 (as shown in FIG. 3). The device 20 may also have a physical connection to the Internet, however, such an arrangement limits where the device 20 can be positioned.

The device 20 has a connection to an external power source 138, but it will be understood that the device 20 may additionally or alternatively have a battery or other internal power source.

The device 20 further comprises an output means, such as a LED or other similar light emitting device 130, and/or a speaker, which in preferred embodiments is used to indicate when a vehicle is within a predetermined distance of the pick-up location or has arrived at the pick-up location.

When the button 126 is pressed, a vehicle request is transmitted to the server 10 containing a reference number associated with the device 20. The server 10 has a list of reference numbers, one for each of the fixed location devices in the system, and a pick-up location associated with each reference number. This limits the amount of data that needs to be contained in the transmitted vehicle request, and also allows the pick-up location associated with a device 20 to be easily changed.

The device 20 has an associated display 124, which is used to display a message for each pending request; the message indicating the current status of the request. The display 124 may be located within the casing 22 of the device 20, as is shown in FIG. 2. In other embodiments, however, the display 124 may be separate from the device, e.g. positioned on a nearby wall. For example, the message can initially say that a request has been placed. It is then changed to say that a vehicle has accepted the request and is en-route to the pick-up location. This message may also include details of the vehicle, the driver and/or the ETA at the pick-up location. The message can then change to indicate that the vehicle has arrived at the pick-up location.

A message is removed from the display when an indication is received from the server 10 that the vehicle associated with the request has left the pick-up location. This determination can be made automatically at the server 10, e.g. by determining that the vehicle has stopped within an area containing the pick-up location for a predetermined period of time and has then moved outside of the area (as will be discussed in more detail below). Alternatively, the driver of the vehicle can indicate on their navigation device 200 that they are leaving the pick-up location, and this indication can be transmitted via the server 10 to the device 20.

The device 20 is arranged is to affixed to a flat surface 142, such as a table, bar area or wall. The device 20 therefore has openings 134 through which screws 140 can be placed to fix the device to the surface 142. The base 135 of the device 20 also has support features, such as rubber feet 132, to aid in securing the device at a single location and preventing the device 20 from moving on a wet surface as may often be found in an environment such as a bar or restaurant. For this reason, the casing 122 of the device will typically be water resistant.

Another form that the vehicle requesting device 12 can take is a mobile device 22, such as a mobile telephone, tablet computer, portable digital assistant (PDA).

The mobile device 22 is located within a housing that includes a processor connected to an input device and a display screen. The input device can include a keyboard device, voice input device, touch panel and/or any other known input device utilised to input information; and the display screen can include any type of display screen, such as an LCD display. In a particularly preferred arrangement, the input device and display screen are integrated into an integrated input and display device, including a touchpad or touchscreen input so that a user need only touch a portion of the display screen to select one of a plurality of display choices or to activate one of a plurality of virtual buttons.

The mobile device 22 has a location determination means, which is capable of determining the current location of the device 22. In a preferred embodiment, the location determination means is a global navigation satellite system (GNSS) receiver, such as a GPS receiver, that receives and processes satellite broadcast signals, including location data, to determine a current location of the device.

A software application runs on a processor of the mobile device 22 that allows a user to create a vehicle request, and to send this vehicle request to the server 10. The vehicle request is sent to the server 10 using a wireless communications module, such as a GSM or GPRS module. The vehicle request will include a pick-up location, which may be the current location of the mobile device 22 (obtained from the GNSS receiver) or can be a location input by the user on the input device. The vehicle request may also include a drop-off location, which again can be selected by the user on the input device, and may also include a pick-up time. The pick-up time can be an indication that a taxi is required as soon as possible, or it may be a specific future time that is input by the user on the input device.

As described above, once the vehicle request from the mobile device 22 is received at the server 10, a vehicle 14 is selected that meets the criteria in the request. A temporary association is then formed between the two devices at the server 10, i.e. such that the two devices will be linked on the system until the requested journey has been completed. The server 10 will transmit details of the selected vehicle 14 to the mobile device 22. The details can include: information about the vehicle, such as model, colour, registration number, etc; information about the driver, such as a picture, name, telephone number, etc; and information about the current position of the vehicle and/or the route that the vehicle will travel to the pick-up location and/or the estimated time of arrival at the pick-up location. The server 10 may continually send the position of the selected vehicle 14 to the mobile device 22, such that the user can see the progress of the vehicle as it travels to the pick-up location.

The user may include a preferred driver or set of drivers that they would like for their requested journey in the request that is transmitted to the server 10. Alternatively, a user may have a one or more preferred drivers associated with a profile stored on the server 10. The server 10 takes account of the preferred driver or drivers when selecting the vehicle to complete the request.

The arrival of the vehicle 14 at the pick-up location is transmitted to the mobile device 22, and an suitable alert is provided to the user. The alert may be a visual alert on the display screen of the device, an audible alert, a haptic alert, or any combination thereof. The arrival of the vehicle at the pick-up location may be automatically determined by the server 10, e.g. as discussed in more detail below. Alternatively, the vehicle's arrival may be determined when the driver provides an indication on their navigation apparatus 200. In addition to providing such an alert, an indication may be provided on the mobile device 22 as to the current position of the vehicle 14 at the pick-up location. The indication can be, for example, a directional pointer or arrow that points towards the current location of the vehicle 14, as received from the server 10, from the current location of the mobile device 22. This pointer could generated using any suitable means within the mobile device 22, such as one or more of a compass, gyroscope and accelerometers. The use of such a pointer or arrow allows a user to identify his or her vehicle 14 even when, for example, it is parked on the street next to a number of other taxis, and thus be difficult for the user to identify.

When the user has found and entered the selected vehicle 14, the driver of the vehicle may immediately start travelling towards the drop-off location, if it was already known from the original vehicle request. Alternatively, the user may simply inform the driver directly of the drop-off location, and then the driver may input the destination into their navigation apparatus 200. In other embodiments, and due to the temporary association that is formed at the server 10 between the two devices, the user may input a desired drop-off location on their mobile device 22 and transmit this destination to the navigation device 200 of the vehicle. The user may even do this after providing the driver with an approximate destination so that the driver can begin the journey before a final drop-off location has been provided. As will be understood, this functionality also would allow the user to modify the drop-off destination en-route should this be desired.

The payment for the journey may be made automatically, for example, by the user setting up an account on the server 10 having a certain amount of money associated with it. The cost of the journey may simply be deducted from the user's account. This may happen automatically, or upon confirmation from the driver and/or user on their respective devices as to the amount of money to be paid.

At the end of the journey, the user can also use their mobile device 22 to provide a rating of the journey and/or of the driver. This rating will be transmitted to the server 10 and associated with the relevant driver's details held at the server 10. The driver's rating can, as discussed above, be used by the user and/or server 10 when selecting a vehicle to complete a vehicle request. The rating associated with a driver may also be automatically reduced if the server 10 determines that the driver did not follow the calculated optimum route, and as a result caused the user's journey to be longer than necessary, either in terms of time and/or distance.

FIG. 4 is an illustrative representation of a navigation device 200 that can be positioned in one of the vehicles 14. The navigation device 200 is shown in block format. It should be noted that the block diagram of the navigation device 200 is not inclusive of all components of the navigation device, but is only representative of many example components. The navigation device 200 is described in the following paragraphs as being a portable navigation device (PND) that can be removable mounted in a vehicle. It will be understood, however, that the navigation device 200 could in other embodiments be built into the vehicle.

The navigation device 200 will typically comprise digital map data having a plurality of navigable segments representing segments of a navigable route in a geographical area covered by the map. The digital map data is used by the navigation device 200 to calculate routes between locations that can be traversed by the vehicle carrying the navigation device, and to provide suitable navigation instructions to driver to guide him or her along the calculated route.

The navigation device 200 is location within a housing (not shown). The housing includes a processor 202 connected to an input device 204 and a display screen 206. The input device 204 can include a keyboard device, voice input device, touch panel and/or any other known input device utilised to input information; and the display screen 206 can include any type of display screen such as an LCD display, for example. In a particularly preferred arrangement the input device 204 and display screen 206 are integrated into an integrated input and display device, including a touchpad or touchscreen input so that a user need only touch a portion of the display screen 206 to select one of a plurality of display choices or to activate one of a plurality of virtual buttons.

The navigation device 200 may include an output device 208, for example an audible output device (e.g. a loudspeaker). As output device 208 can produce audible information for a user of the navigation device 200, it is should equally be understood that input device 204 can include a microphone and software for receiving input voice commands as well.

In the navigation device 200, processor 202 is operatively connected to and set to receive input information from input device 204 via a connection 210, and operatively connected to at least one of display screen 206 and output device 208, via output connections 212, to output information thereto. Further, the processor 202 is operably coupled to a memory resource 214 via connection 216 and is further adapted to receive/send information from/to input/output (I/O) ports 218 via connection 220, wherein the I/O port 218 is connectible to an I/O device 222 external to the navigation device 200. The memory resource 214 comprises, for example, a volatile memory, such as a Random Access Memory (RAM) and a non-volatile memory, for example a digital memory, such as a flash memory. The external I/O device 222 may include, but is not limited to an external listening device such as an earpiece for example. The connection to I/O device 222 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 4 further illustrates an operative connection between the processor 202 and an antenna/receiver 224 via connection 226, wherein the antenna/receiver 224 can be a GPS antenna/receiver for example. It will be understood that the antenna and receiver designated by reference numeral 224 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 4 are powered by power sources (not shown) in a conventional manner. As will be understood by one of ordinary skill in the art, different configurations of the components shown in FIG. 4 are considered to be within the scope of the present application. For example, the components shown in FIG. 4 may be in communication with one another via wired and/or wireless connections and the like. Thus, the scope of the navigation device 200 of the present application includes a portable or handheld navigation device 200.

In addition, the portable or handheld navigation device 200 of FIG. 4 can be connected or "docked" in a known manner to a vehicle such as a bicycle, a motorbike, a car or a boat for example. Such a navigation device 200 is then removable from the docked location for portable or handheld navigation use.

Figure 5:
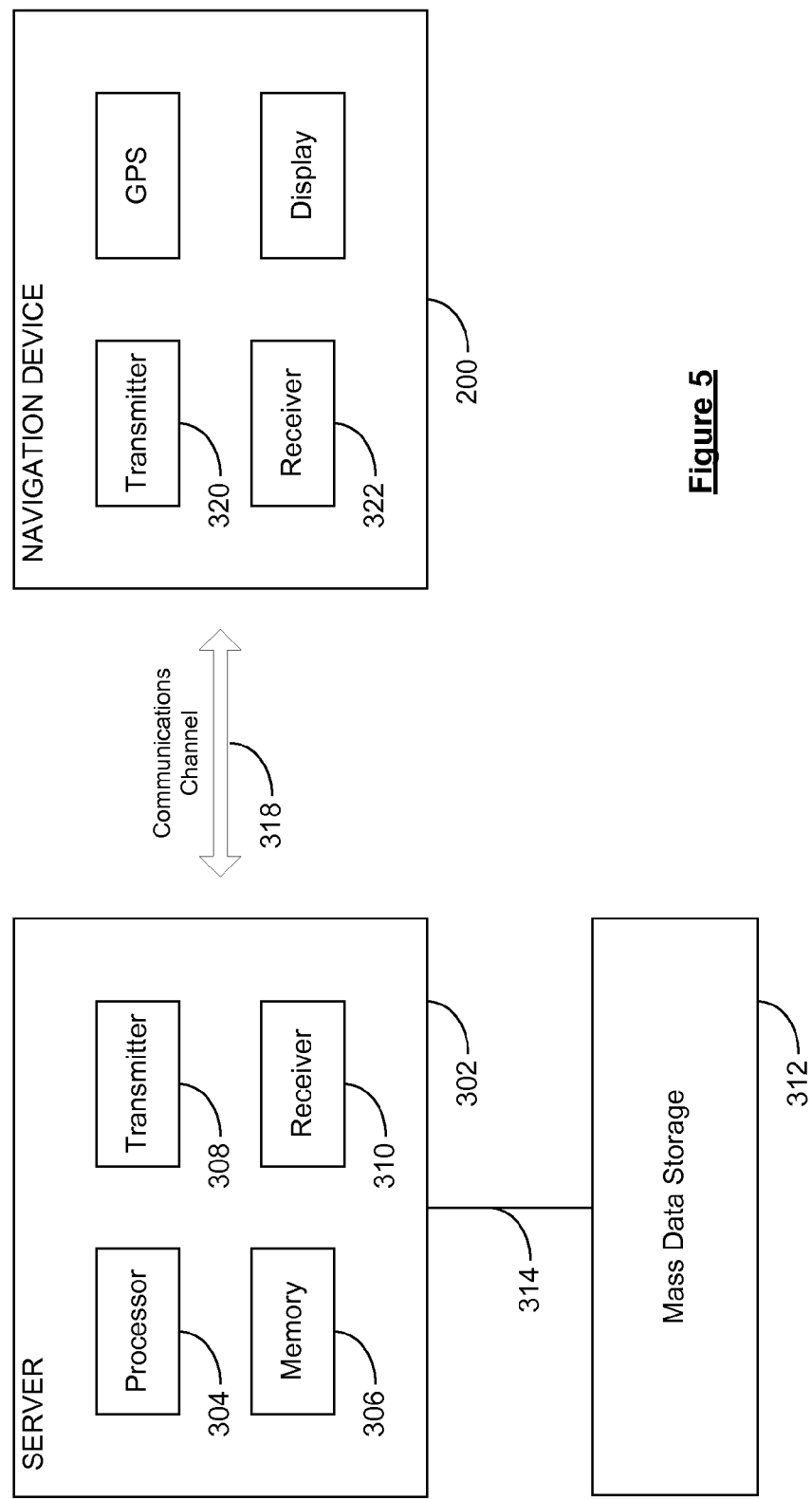
FIG. 5 is a schematic illustration of the manner in which a navigation device may receive information over a wireless communication channel.

Referring now to FIG. 5, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc; model/manufacturer specific settings may be stored on the navigation device 200, for example. The data stored for this information can be updated.

In FIG. 5 the navigation device 200 is depicted as being in communication with the server 302 via a generic communications channel 318 that can be implemented by any of a number of different arrangements.

The server 302 and a navigation device 200 can communicate when a connection via communications channel 318 is established between the server 302 and the navigation device 200 (noting that such a connection can be a data connection via mobile device, a direct connection via personal computer via the internet, etc).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc as previously described with regard to FIG. 4, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc. In other embodiments, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

Figure 6:
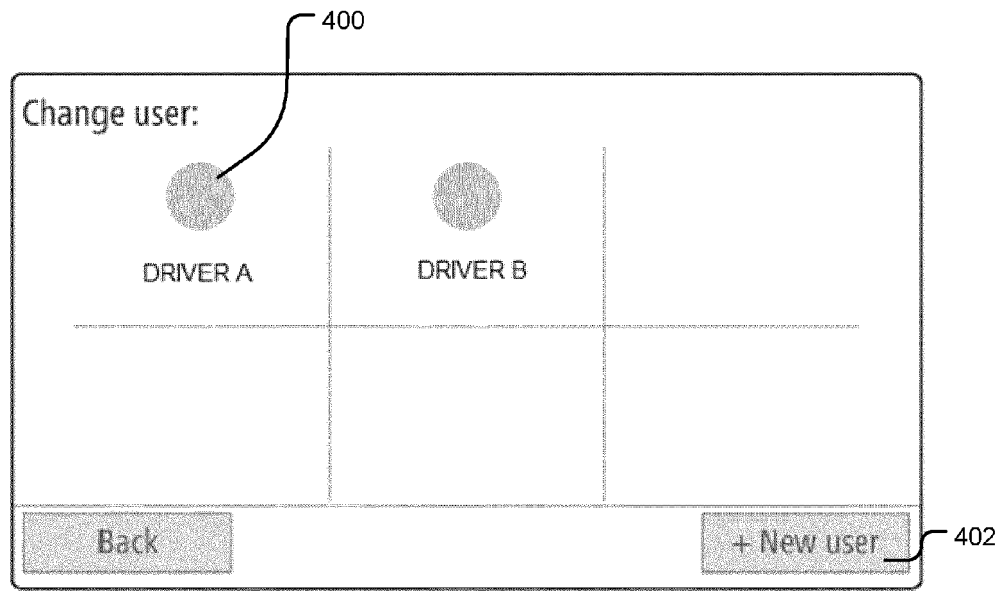
FIGS. 6 to 15 are exemplary display screens on a navigation device used in the system.

In preferred embodiments, the navigation device 200 is arranged to store a number of user profiles, such that the same device can be used by a number of different people. This is beneficial when the navigation device 200 is used within a taxi or other similar vehicle, which will often be shared between a number of different drivers. When a particular user logs onto the device, e.g. by touching the "Driver A" icon 400 or by entering his or her details using the "new user" icon 402 (as shown in FIG. 6), an indication of this selection is sent to the server 10, such that the server can associate the driver with the vehicle. The correct driver details and/or rating can accordingly be supplied to a user when the vehicle is selected to complete a submitted vehicle request from the user.

When a vehicle request is received at the server 10, one or more suitable vehicles 14 are selected and the request is transmitted to the navigation device 200 within the or each vehicle. An exemplary screen that is shown on the navigation device 200 can be seen in FIG. 7. In this instance, the vehicle request 404 relates to a person that is asking for a vehicle as soon as possible at a location in the centre of the city of Amsterdam.

Figure 7:
Figure 8:
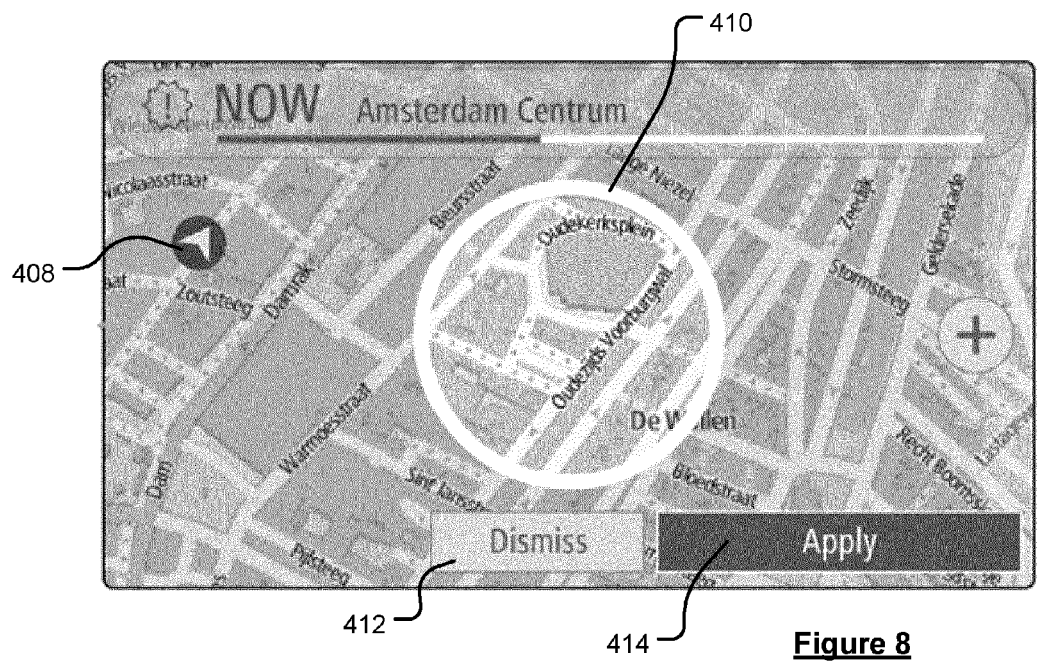

In the lower left hand corner of the screen of FIG. 7 is a selected icon marked "Break" 406. The driver can touch this icon at any time to indicate they are not available to take requests at the current time. As will be appreciated, when the icon 406 is touched, then an indication is transmitted to the server 10 from the navigation device 200 to notify the system that the vehicle is not currently available.

If the driver should touch the vehicle request message 404, then the navigation device pans the displayed map such that it is centred at the pick-up location associated with the request. The pick-up location is highlighted on the screen, e.g. by a circle 410 and/or by fading or greying the other portions of the map display, such that the driver can quickly identify the pick-up location. The current position of the vehicle 408 is also shown on the screen, again to aid the driver in identifying the pick-up location. If the driver wishes to apply for the vehicle request, then they can touch the icon 414. Alternatively, if the driver wishes to decline the vehicle request, then they can touch the icon 412.

Figure 9:
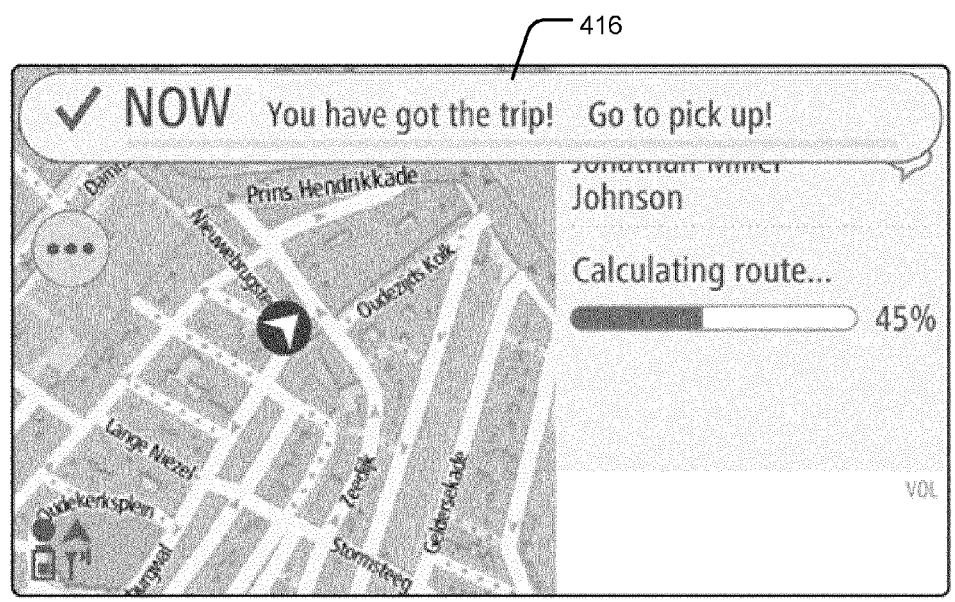
Figure 10:
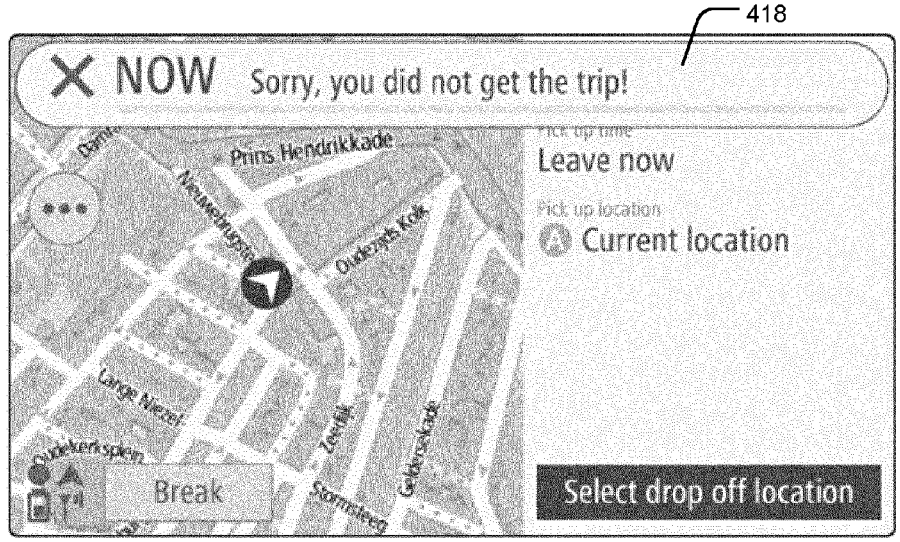

If the driver applies for the vehicle request 404, then they will either win the request as shown in FIG. 9 or lose the request as shown in FIG. 10.

Figure 11:
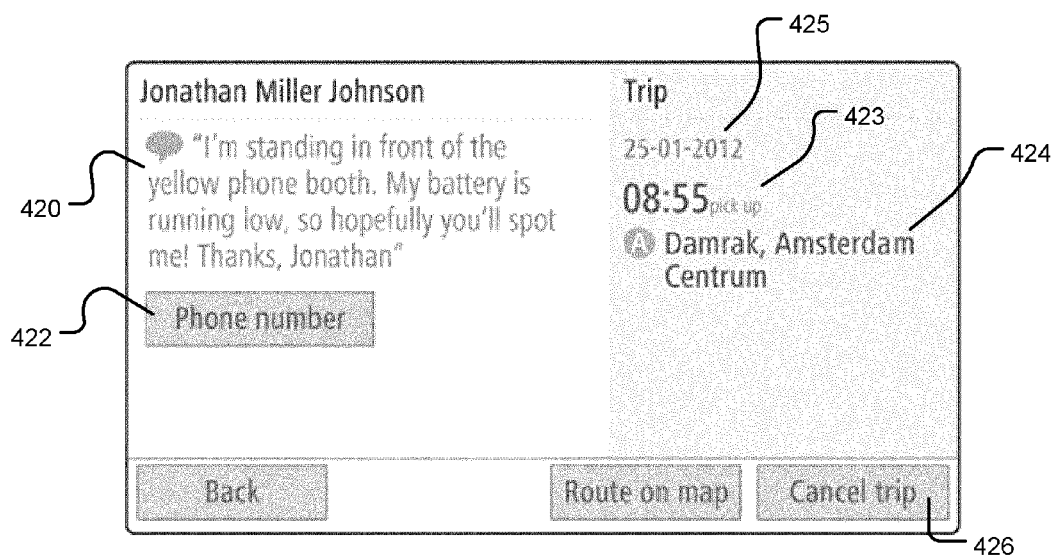

If the driver wins the request, then full details of the vehicle request will be sent by the server 10 to the navigation device 200. For example, for the vehicle request in question, and as shown in FIG. 11, the request has been submitted by or on behalf of a Jonathan Miller Johnson. The details of the request will include at least the pick-up location (A) 424; in this case the Damrak in the centre of Amsterdam. The driver will also see the date of the request —425 and an estimated time of arrival at the pick-up location —423. The ETA at the pick-up location is determined by the navigation device 200 planning a route from the current location of the vehicle to the pick-up location, which in preferred embodiments takes account of historic, current and/or estimated future traffic conditions. As shown in FIG. 11, the request may also include a message from the user indicating where they are currently located, e.g. "I'm standing in front of the yellow phone booth", and an icon 422 that allows the driver to contact the user.

The trip details screen shown in FIG. 11 can be accessed at any time throughout a journey by the driver, and the information contained therein will be updated to reflect the current status of the journey. For example, when the user has been picked up at location A and has provided a destination location to the driver, then the screen will also include details of this location and an associated ETA. The trip details screen can also be used by the driver to cancel a trip that they had previously accepted. This can be done by selecting the "cancel trip" icon 426, and a suitable message will be sent to the server 10. The message may include a reason for the cancellation, such as traffic, the vehicle being in an accident or the vehicle breaking down. Upon receipt of such a cancellation, appropriate action can be taken at the server 10, such as sending another vehicle to the pick-up location and notifying the user accordingly, or, in the case that the current vehicle has broken down, sending another vehicle to location of the current vehicle. The rating of a driver could be automatically decreased by a certain amount if a trip is cancelled without a valid reason.

Figure 12:
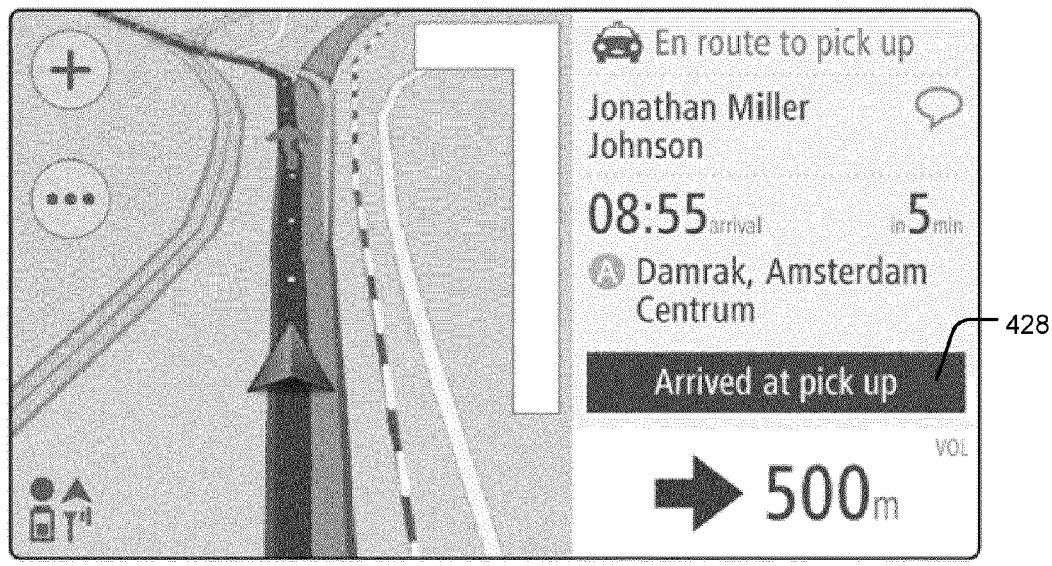

Once a trip is accepted and/or won by a driver, the navigation device 200 will automatically calculate a route to the pick-up location and provide guidance to the driver. This is shown, for example, in FIG. 12. The arrival of the vehicle at the pick-up location can be indicated by the driver selecting the "arrived at pick up" icon 428, again as shown in FIG. 12. It is also contemplated, however, that the arrival of the vehicle at the pick-up location may be determined automatically at the server 10, and a message indicative thereof being sent to the navigation device 200. The manner by which the server 10 can automatically detect the arrival and/or departure of a vehicle from a particular location will be described in more detail below.

Figure 13:
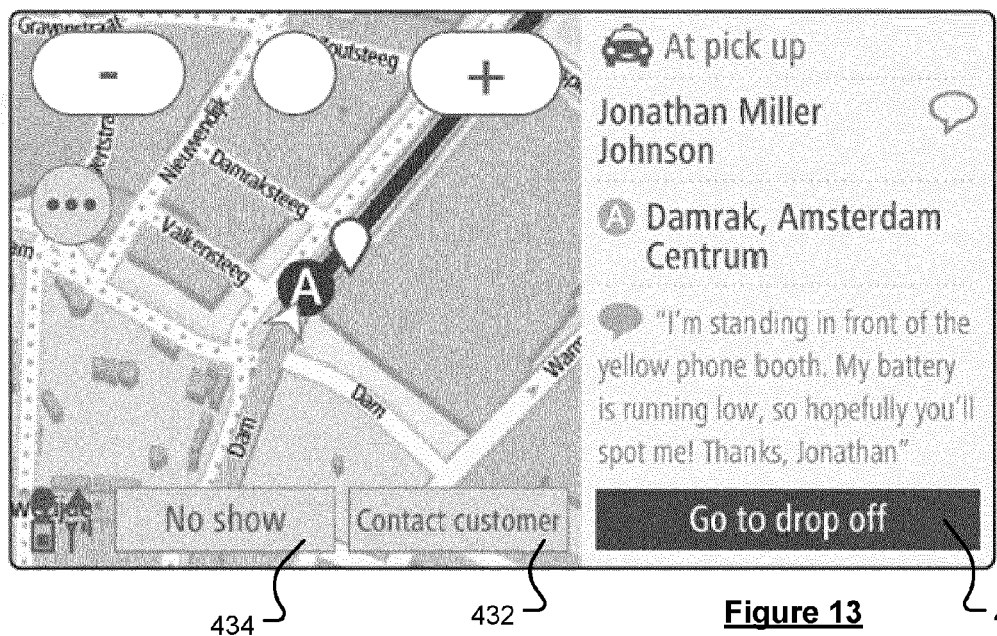

When the vehicle reaches the pick-up location (A), the navigation device 200 will display the screen shown in FIG. 13. The user will, at this point, get into the vehicle and if a drop-off location has not yet been provided, i.e. in the original vehicle request, then the driver will ask the user for the drop-off location. This may be input by the driver on the navigation device 200, or it may be provided by the user on the requesting device, e.g. mobile device 22. Once a drop-off location has been provided, then the driver can select the "go to drop off" icon 430 (as shown in FIG. 13), and the navigation device 200 will calculate a route from the pick-up location (A) to the drop-off location (B) and provide navigational guidance to the driver.

As shown in FIG. 13, if the driver and user are not able to immediately locate each other when the vehicle reaches the pick-up location, the driver can attempt to contact the user using the "contact customer" icon 432. If the driver is still not able to locate the user, then they can select the "no show" icon 434, whereupon a suitable message is sent to the server 10. The server 10 may decrease a rating of the user associated with their account following such an event. This prevents a user from abusing the system and continually making invalid vehicle requests.

Figure 14:

As the driver is guided to the drop-off location, a screen such as that shown in FIG. 14 will be displayed on the navigation device 200. As with the arrival at the pick-up location, the arrival of the vehicle at the drop-off location can be indicated by the driver selecting the "arrived at drop off" icon 436, as shown in FIG. 14. It is again contemplated, however, that the arrival of the vehicle at the drop-off location may be determined automatically at the server 10, and a message indicative thereof being sent to the navigation device 200.

Figure 15:
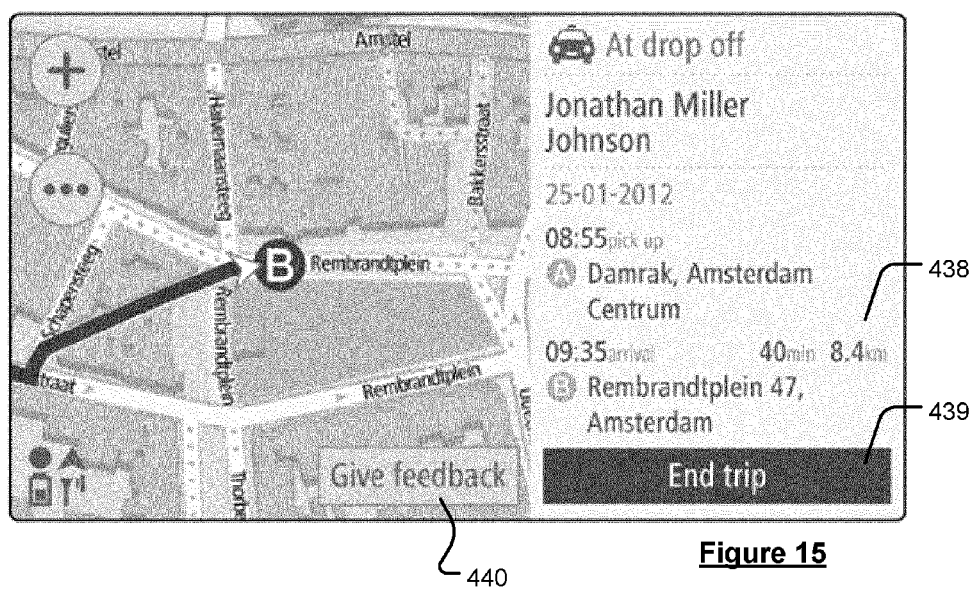

When the vehicle reaches the drop-off location (B), the navigation device 200 will display the screen shown in FIG. 15. From this screen, the driver can see a summary of the completed journey 438, including the journey time and distance. The driver can end the journey by selecting the "end trip" icon 439, which can cause a message to be sent by the server 10 to a mobile device 22 of the user to confirm payment for the journey. The driver can also select the "give feedback" icon 440 to provide information about the journey and/or the user. For example, the driver can indicate that they do not wish to receive further vehicle requests form the user.

Figure 16:
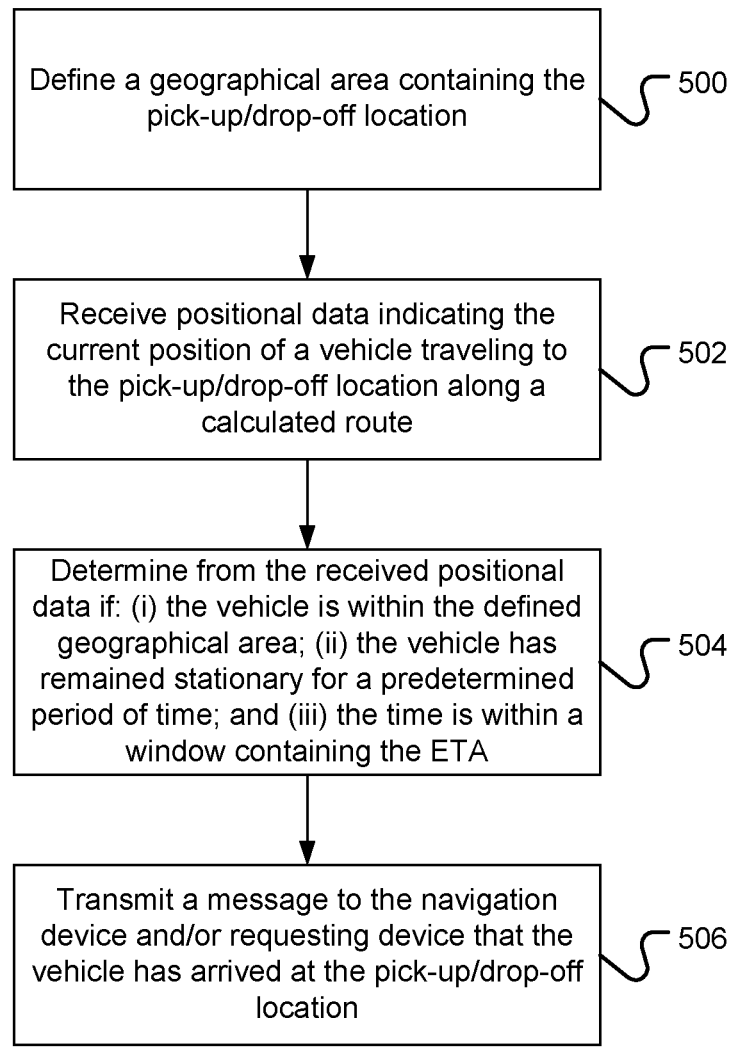
FIG. 16 illustrates the steps of a method of automatically determining the arrival of a vehicle at a pick-up or drop-off location.

The manner by which the server 10 can automatically determine the arrival of a vehicle at a pick-up or drop-off location will now be described with reference to FIG. 16.

The server 10 defines a geographical area containing the pick-up or drop-off location—500. Typically, this area is a circle of radius 250*m* centred at the location. The positional data relating to the vehicle travelling to the location can then analysed to determine if the vehicle has slowed down and stopped for a predetermined period of time within the defined area and has stopped at a moment in time that is within a time window containing the estimated time of arrival associated with the calculated route—504. By utilising the ETA of the calculated route in the arrival detection algorithm, a chances of mistakenly determining that the vehicle has arrived at a location when in fact the vehicle is, for example, stopped at traffic lights on an adjacent road, are substantially reduced.

In the above description, it is assumed that the user will have made a request for a vehicle using one of the described vehicle requesting devices 12 and that they will enter the vehicle when it arrives at the requested pick-up location. In this scenario, the transmission of the vehicle request results in a temporary association being formed at the server 10 between the vehicle requesting device 12 and the vehicle 14. This temporary association can then be used to provide many of the benefits associated with the present invention, such as electronic payment, modifying the drop-off location en-route, rating the driver and/or passenger, and the passenger viewing the route that should be travelled by the vehicle. It will be understood, however, that if a user hails a nearby passing vehicle, then no such temporary association will be made even if both the user and the vehicle are part of the vehicle request management system of the present invention.

Figure 17:
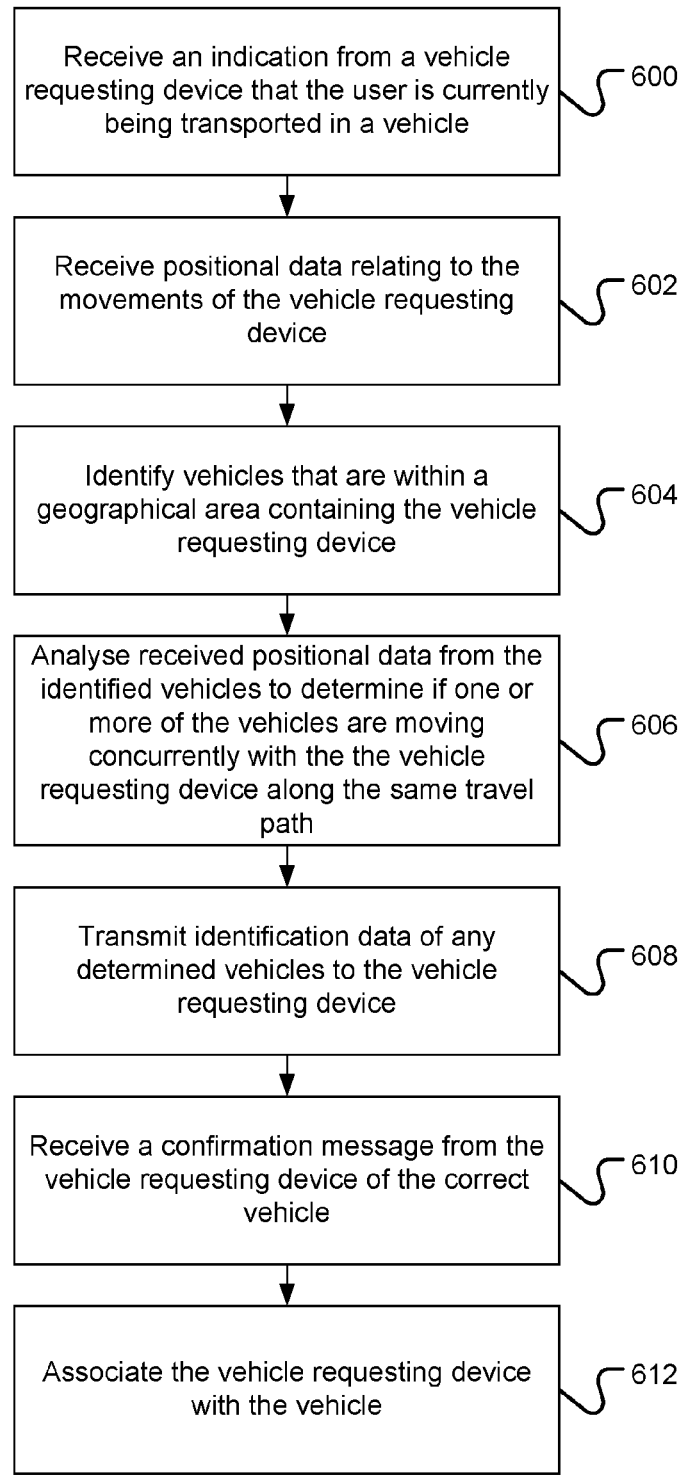
FIG. 17 illustrates the steps of a method of forming an association between a mobile device carried by a user and navigation device in a vehicle.

This problem can be overcome by using the method illustrated in FIG. 17.

When a user hails a passing taxi, they can send an indication to the server 10 using their mobile device 22 that they have or are about to enter a vehicle 14—600. This indication can be generated, for example, simply by opening the appropriate software application on their mobile device 22. Using the positional data that is sent to the server 10 from the mobile device 22, and which is indicative if the position and movements of the mobile device 22, the server 10 can identify those vehicles that are within a predefined geographic area containing the mobile device 22. This area may be circle, e.g. having a radius of about 30 meters, centred at the current location of the mobile device 22—604. Once any such vehicles have been identified, then a comparison can be made at the server 10 between the positional data received from the mobile device 22 and the positional data of the identified vehicles to determine if any of the vehicles are moving concurrently with the mobile device 22 along the same travel path. Such concurrent movement can be indicated by similar speeds, accelerations, directional changes, and the like. If only a single vehicle is identified as moving concurrently with the mobile device 22, then it can be inferred that this must be the vehicle in which the user is currently travelled and the server 10 forms associates the mobile device 22 with the navigation apparatus 200 within the vehicle. Alternatively, if a plurality of candidate vehicles are identified, then a list of the vehicles with suitable identification information, e.g. details of the vehicle and/or driver, are sent by the server 10 to the mobile device 22—608. The user can then select the appropriate vehicle from the list on the mobile device 22, and this selection can then be transmitted back to the server 10—610. The server 10 will then associate the mobile device 22 with the navigation device 200 within the selected vehicle—612.

Some preferred embodiments of a method of selecting vehicles to service vehicle requests in accordance with the invention will now be described by references to FIGS. 18 and 19.

A preferred embodiment of the invention will be described with reference to "immediate fulfilment" type vehicle requests, i.e. requests from a user to be provided as soon as possible, rather than for a specified future time. It will be appreciated however that the methods may also be applied to scheduled vehicle requests for a specified future time, or to combinations of immediate and scheduled type vehicle requests. Some ways in which the method may be modified to handle scheduled requests will be outlined below.

The method will be described with reference to the flow chart of FIG. 18 and a system of the type shown in FIG. 1, which includes a server 10, a plurality of vehicle requesting devices 12 and a plurality of vehicles 14, each being equipped with a device 200 having route planning and navigation functionality. The methods of the present invention relate to the manner in which the server selects a suitable vehicle to meet the criteria set out in a vehicle request.

Figure 18:
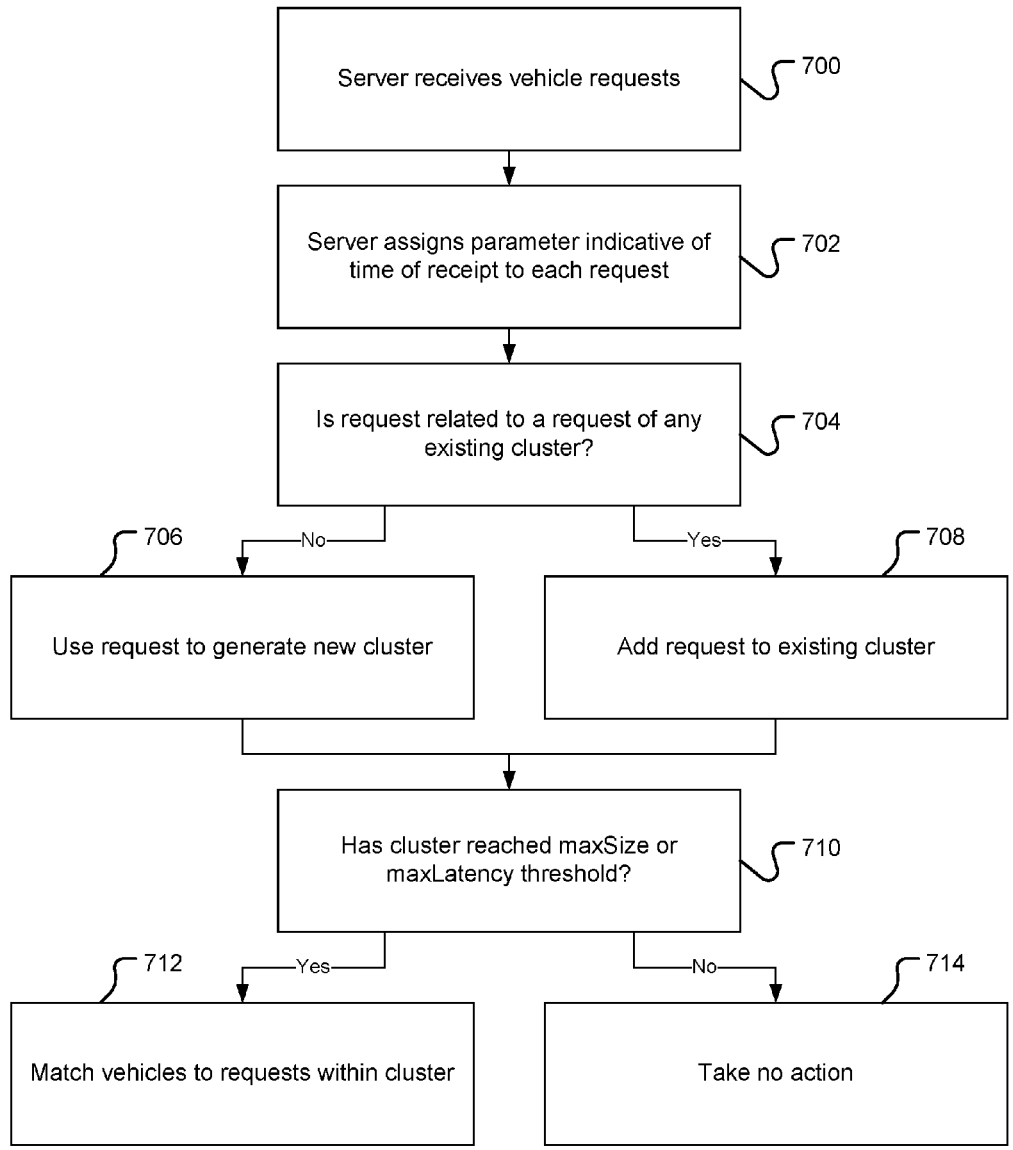
FIG. 18 illustrates the steps of a method for matching vehicles to vehicle requests in accordance with the invention.

The server 10 receives requests for vehicles from the vehicle requesting devices 12 from users—step 700 of FIG. 18. The vehicle requesting devices may be of any of the forms discussed above in relation to FIG. 1. A vehicle request includes a pick-up location, or data that can be used to derive such a location, and may also include at least one of: a pick-up time; a drop-off location; a desired vehicle type or size (e.g. car, minivan, limousine, etc); the number of passengers to be picked-up; and any additional preferences, such as the need for a child seat, the need for disabled access or if a particular driver is desired. The vehicle requests can be transmitted to the server 10 using any suitable communication means, such as the mobile telecommunication network, the Internet, etc.

Upon receipt of a vehicle request, the server assigns a parameter to the request indicative of the time of receipt of the request at the server—702. The parameter may be a time, or data indicative of a time, e.g. a number which may be used to determine the time at which a given request was received relative to preceding and following requests.

In a conventional system, a vehicle would typically be allocated to a vehicle request once received by reference to the criteria associated with the request, the pick-up location, and the geographic locations of available vehicles. However, the inventors have realised that assigning a vehicle to each vehicle request on the basis that it is the best match for the vehicle request in question may be disadvantageous to the degree of matching that can be achieved over the system as a whole. The following example illustrates the problems associated with conventional allocation methods.

Figure 19:
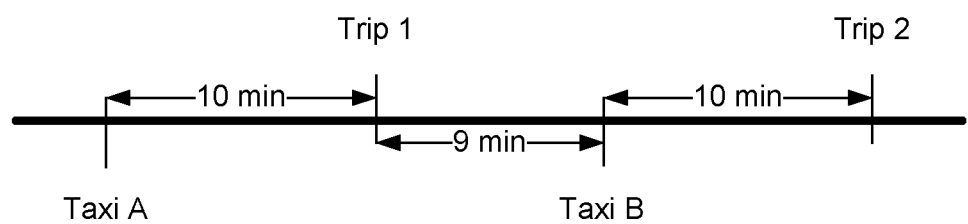
FIG. 19 illustrates how the present invention can be used to optimise the waiting time for users making vehicle requests.

By way of example, consider the situation shown in FIG. 19 where there are two available vehicles on a given stretch of road, Taxi A and Taxi B. Two vehicle requests are received in short succession. The first request received is Trip 1, and the second is Trip 2. A conventional system would receive Trip 1 and allocate one of Taxis A and B to the request, based on the proximity of the vehicle to the pick-up location associated with the request. Let us assume that the pick-up location associated with Trip 1 is 10 minutes along the road from Taxi A, and 9 minutes from Taxi B, with the location being between Taxis A and B. A conventional system would allocate the Trip 1 to Taxi B, giving a wait time of 9 minutes. In this example, the Trip 2 that is then received is associated with a pick-up location that is 10 minutes along the road from Taxi B, in the direction away from Taxi A. As Trip 1 has just been allocated to Taxi B, this vehicle is no longer available to service Trip 2. Thus, Trip 2 has to be allocated to Taxi A, which is a total of 29 minutes along the road from Taxi A. It may be seen that allocating each request on a best match basis according to estimated time of arrival of a vehicle may result in lower waiting times for some users e.g. the user for Trip 1, but at the expense of other users, e.g. that associated with Trip 2. If allocation had been deferred, rather than taking placing immediately on receipt of Trip 1, Trip 2 would have been received, and it would have been possible to take into account both Trips 1 and 2 in the allocation process. The best allocation would then have allocated Trip 1 to Taxi A and Trip 2 to Taxi B, resulting in a 10 minute wait for the user for Trip 1 and a 10 minute wait for the user with Trip 2. Thus, the average wait time for Trips 1 and 2 is reduced from 19 minutes to 10 minutes.

The inventors have realised that by considering clusters of vehicle requests together when assigning vehicles to the requests, it is possible to achieve more optimised matching of vehicles to requests over the set of requests, and reduce average wait times. In accordance with the methods of the present invention, vehicle requests are grouped together into "clusters" for the purposes of matching.

Returning to FIG. 18, when a new vehicle request is received at a server, and allocated a parameter indicative of a time of receipt at the server, it is then immediately allocated to a cluster of requests. A cluster of requests is a group of requests that will be matched to vehicles together, i.e. the matching will take into account all requests in the cluster. The present invention generates clusters in a manner which results in the requests in the clusters being related according to certain criteria.

In order to allocate a vehicle request to a cluster, it must be determined whether the request is related to any request of an existing cluster or clusters—704. This is determined using a "relation parameter" associated with each existing cluster. The relation parameter in one implementation requires that a new request may be considered related to a request of an existing cluster when the request has a pick up location within a predetermined range of the request.

If a request is found not to be related to any request of any existing cluster, then it is used to initiate a new cluster—706. If the request is found to be related to a request of an existing cluster, the request is added to the cluster—708. If the request is found to be related to a request of more than one existing cluster, then the request is added to a new cluster formed by merging each of the existing clusters.

Each cluster is allocated a creation time. In the case of a cluster that is generated when a first request is allocated to it, such that the request initiates the cluster, the creation time of the cluster corresponds to the time of addition of the request to the cluster. Where a cluster is created by merging existing clusters, the creation time is set to the creation time of the oldest existing cluster forming part of the new cluster.

In this way, clusters of related requests are built up. New requests can be added to an existing cluster until such time as the cluster is deemed "complete". When the cluster is complete, no new requests are added, and the requests in the cluster are subjected to matching to available vehicles.

Each cluster is associated with two thresholds used to determine when the cluster is full. The first threshold ("maxSize") is in relation to a maximum number of requests that can be contained by the cluster i.e. a maximum size of the cluster. The second threshold ("maxLatency") is in relation to a maximum time that a vehicle request may remain in the system before being matched. This threshold is considered using the generation time of a cluster. As request are added to clusters as soon as they are received, the generation time of a cluster should approximate the age of the oldest request in the cluster. These thresholds may be referred to as the "size" and "time" thresholds. A cluster is deemed complete and sent to a matching stage when either one of these thresholds is exceeded. In general, where there are a large number of requests per unit time which may be added to a cluster according to the defined relation parameter, the cluster will tend to be deemed complete on the basis of the maximum size threshold being reached, while in less busy regions, the cluster will be more likely deemed complete on the basis of the time threshold being reached first.

In step 710, the method comprises determining whether a cluster has reached maxSize or maxLatency. If the answer is no, no action is taken. If the answer is yes, the requests in the cluster are sent to a matching stage.

The clusters may be polled on a regular basis to retrieve those clusters ready for matching on the basis of the maxSize or maxLatency thresholds being exceeded. The way in which matching is carried out is described below. If a cluster is found to meet one of the thresholds, matching within the cluster is carried out —712. If the cluster does not meet a threshold, no action is taken—714.

It will be appreciated that by reference to the example set out above, especially when the system is busy, i.e. there is a high spatial density of vehicles available to service requests and/or a high number of requests being made per unit time, improved matching, resulting in lower average wait times for users may be achieved by waiting a longer time before carrying out matching of vehicles to requests, to enable a group of requests to be considered together, rather than simply matching a closest vehicle to each request as the requests come in. However, in an online system where requests come in continually over an endless period, it is not possible to wait forever, as there is no limit to the number of requests that may come in.

In general, the longer it is waited before carrying out matching, the more optimal the matching may be. However, this has to be balanced against the additional delay introduced for users, before matching even commences. As an illustration, consider the two extreme cases. When matching each trip request immediately when it becomes known, no additional delay is incurred, but from a global perspective, this may lead to a poor average quality of matches. When waiting for all trip requests before doing the matching, an infinite delay is introduced, but the average quality of matching could be tuned to optimality.

The best balance between these conflicting factors is dependent upon how busy the system is at a given time, i.e. on the temporal distribution of trip requests. When many requests come in per time unit, the number of trip requests matched at once can be increased greatly at the cost of only a small additional delay. At slow times, on the contrary, even after waiting for a long time only few or no additional trip requests may appear, improving the quality of matches only insignificantly, and at the cost of a significant delay. The geographical distribution of trip requests is also a significant factor in achieving appropriate balance. For example, at the same time, the system may be busy in one geographic region, such as a neighbourhood, district, city, region, or even country, but it may be slow in another.

Rather than applying uniform rules upon which clusters are generated based on a global state, e.g. level of how busy the system is, the present invention generates the clusters in a manner that is dependent upon the temporal and geographical distribution of vehicle requests, and/or the geographical distribution of vehicles available to service the requests.

The way in which the clusters are generated, e.g. the relative size of clusters, and the geographical spread of locations associated with requests of the cluster, may be controlled using the relation parameter, and time and size thresholds (maxSize, maxLatency) discussed above.

To this end, the relation parameter used to determine whether a vehicle request is added to an existing cluster, or used to create a new cluster by initiating the cluster or merging existing clusters, is dependent upon one or more of these factors. It is desirable that the parameter is dependent upon a spatial density of vehicles in a geographic region associated with the cluster. The geographical region associated with a cluster varies as the cluster is built up, and is defined with respect to a pick-up location of one or more of the vehicle requests of the cluster, e.g. based on a notional "centre" of the pick-up locations of requests forming part of the cluster at any time. Alternatively the geographical region may be based upon the pick-up location associated with a request first added to the cluster. The region may be of any desired extent to provide a required degree of resolution of the system with respect to geographical variation in how busy the system is. For example the region may be an outskirt or centre of town region.

Where there is a high spatial density of vehicles in the region, it is likely that there will be a vehicle in close proximity to any particular pick up location associated with a request. Thus, there is no benefit in including request associated with widely geographically spaced pick-up locations in the same cluster, for matching together, as it is unlikely a given vehicle will be a good match for both trips. In this case, the relation parameter may be set to require a high level of relationship between a request added to the cluster and existing requests of the cluster, e.g. by setting the requirement for maximum distance of pick-up location from a pick-up location of a request in the cluster to require only a small distance. This will result in a larger number of clusters being generated containing requests associated with pick-up locations which are confined to a relatively small geographical region.

Similarly the relation parameter may be set to require a closer degree of relationship between requests added to a cluster where the spatial density of pick-up locations associated with requests in a geographical region associated with a cluster is high and/or a number of requests in the geographical region associated with the cluster per unit time is high, resulting in a larger number of clusters with smaller geographical spread in these busier regions.

The time and size thresholds may also be chosen dependent upon similar factors, i.e. a spatial density of vehicles or vehicle requests in a geographical region associated with a cluster and/or a temporal distribution of requests in the region. However, in other embodiments the time and size thresholds are independent of such factors.

The time and size thresholds may be set to provide a required level of responsiveness of the system when busy. By setting the maximum size threshold to be low, more clusters will be deemed complete and ready for matching by virtue of reaching this threshold when the system is busier. If the size threshold is set to be high, more clusters will be deemed complete, and ready for matching, based on reaching the time threshold, maxLatency, even when the system is not so busy. The time threshold should be set to a level to set a desired level of responsiveness required for the system.

The thresholds and the relation parameter should be set to try to achieve the largest possible clusters of related trips (i.e. in terms of number of requests contained), within a given time threshold, i.e. maximum latency, in geographical regions that are less busy at a given time, while providing large enough clusters of related trips to provide good levels of matching in the smallest possible time, i.e. latency, in regions that are busy at a given time.

In general, it can be expected that the system will provide multiple smaller clusters in a city centre type region i.e. a busier region that get deemed complete and ready for matching based on exceeding the maxSize threshold, and a smaller number of larger clusters in a quieter outskirts area, which are deemed complete and ready for matching based on exceeding maxLatency.

It will be appreciated that the relation parameter may be based on multiple criteria used to determine relatedness of requests, not just on the basis of geographical factors. For example, the parameter might take into account user preferences associated with the request such as number of passengers to be carried, type of vehicle etc. The relation parameter should result in clusters of requests being formed that are likely to be serviceable by the same set of vehicles, facilitating matching.

While the above process has been described by reference to immediate fulfilment type requests, scheduled requests could be accommodated in the system. For example, they may be introduced into the clustering process a predetermined time, e.g. 30 minutes before pick-up time, or could be handled in a separate clustering system dedicated to such requests. Alternatively, scheduled requests could be clustered using a relation parameter based not only on geographical factors, i.e. pick-up location, but also pick-up time.

The operation of the matching stage for matching vehicles to requests of each cluster will now be described. Once a cluster is complete, it is sent on to a matching engine. Matching of the requests is carried out within the cluster.

First a set of candidate vehicles is selected which may be suitable for servicing the vehicle requests in the cluster. This is achieved by selecting a subset of vehicles having current locations within a given range of a pick-up location or locations associated with one or more requests of the cluster. For example, the range may be defined by reference to a single pick-up location, or some type of centre of multiple locations. This provides a set of vehicles and a set of requests to be matched to one another.

Conventionally matching processes are carried out with the aim of minimising estimated time of arrival (ETA) of a vehicle at a pick-up location. However, the inventors have realised that ETA is only one of a number of factors which may be important to both drivers and users. The matching process of the present invention may better balance the needs of drivers and users with respect to such additional criteria. For example, users may have a favourite, or black-listed driver, or positive or negative preferences regarding characteristics of the vehicle and/or driver. Drivers associated with vehicles might have favourite (or black-listed) users, preferred areas for pickups, or preferred directions they would like to be driving in (e.g., to get closer to home towards the end of the shift). Furthermore the request management system may have preferences, e.g. it might want to reward especially reliable drivers by assigning them to especially profitable trips.

In order to try to balance such preferences, a match value is assigned to each potential pair of a vehicle request and a vehicle. This value is computed as a weighted combination of ETA and different scores with respect to any of the additional criteria that are to be taken into account.

A user may be able to specify for each vehicle request the relative weight to be assigned to ETA in comparison to other criteria, e.g. whether the driver has a high safety rating, etc. Likewise, a driver may be able to specify that a higher weight should be attributed to providing trips that bring the driver closer to a home location at certain times of day.

The matching optimization process may be modelled as a maximum weight matching problem in a bipartite graph, where the match values described above function as weights on the edges connecting vehicles and vehicle requests. An optimal solution, i.e. a matching with highest average match value for each matched pair, can be computed in various ways, e.g. by a primal-dual algorithm also known as the Hungarian Method.

A cost function may be used to determine a ranked list of suitable drivers, i.e. vehicles for fulfilling a given vehicle request. It will be appreciated that where certain vehicles may be used by multiple drivers, the rank of a vehicle in the matching process will depend upon the driver known to be driving at the given time or anticipated to be driving at the relevant pick-up time. A positive or negative grade may be generated with respect to each parameter, and may be multiplied by a weight of the customer preference for the parameter. In this way, the user preferences for an individual user may be correlated to the performance of the driver associated with a vehicle for the parameters. Weighing and comparing the outputs of all possible drivers may result in a ranking for the best matched drivers being generated.

In relation to matching vehicles to vehicle requests of a cluster, once a most suitable driver has been identified for each vehicle request within the cluster, the vehicle request is offered to the driver. This may be carried out by transmitting details of the pick up location, and any other details associated with the vehicle request, to a device, e.g. navigation device associated with the vehicle. This may be carried out in the manner described above.

As the matching is preferably carried out such that it is not solely based upon geographical factors, it is likely that the request will be accepted by the driver of the vehicle found to be the most suitable for that request. However, it is recognised that selecting only one vehicle for each trip request may not be sufficient, as drivers might reject or not respond to offers.

In some embodiments a further process is implemented to offer requests to back-up vehicles should the first, most suitable driver not accept the request.

When the vehicle requests of a cluster are matched to vehicles according to the above techniques, to provide appropriate matching across the cluster as a whole, each vehicle request is preferably allocated to at most one vehicle. These vehicles are referred to as rank 1 vehicles (or alternatively the drivers associated with the vehicles may be considered rank 1 drivers).

In addition to these rank 1 vehicles, back-up drivers are selected, i.e. rank 2, 3 or higher drivers. A rank 2 vehicle is a vehicle that is considered to have the highest match value for a request when the matching process is conducted in a conventional manner taking into account just that one vehicle request, i.e. rather than attempting to optimise in relation to all requests of a cluster. A rank 2 vehicle may be determined for each trip. A rank 3 vehicle may be considered to be the next most suitable vehicle based on conventional techniques and so on. A single rank 2 or higher rank vehicle may be allocated to each vehicle request, or a plurality of such vehicles may be allocated to each request. For example, where two rank 2 vehicles are allocated, these may be the vehicles with the highest and next highest match value based on the conventional techniques and so on.

Various arrangements may be envisaged in which vehicles of each rank are exclusively assigned to one request, e.g. such that they are not available for other requests as a vehicle of the same rank and/or are not available for trips as a vehicle of higher rank.

One specific implementation keeps rank 1 vehicles fully exclusive, i.e. a vehicle can only be a rank 1 vehicle for at most one request, and a rank 1 vehicle cannot be a vehicle of a higher rank for any request; while the only constraint on vehicles of rank 2 or higher is that they might only appear as a vehicle (of any rank) for the same request at most once.

The vehicle ranks can be used to offer trips to vehicles in a certain order. A request is first offered to its rank 1 vehicle (or, if there are several, to all of them simultaneously). If the rank 1 vehicle (or all of them) does not accept the request within a given time period, the request is offered to its rank 2 vehicle (or, if there are several, to all of them simultaneously), and so on.

The parameters of this process, i.e. the number of "rounds" in which a vehicle is offered and the number of vehicle for each rank, may be set as desired. One specific implementation may have only one vehicle for each rank such that a request is never offered to several vehicles simultaneously, avoiding race conditions for drivers.

It will appreciated that whilst various aspects and embodiments of the present invention have heretofore been described, the scope of the present invention is limited to the particular arrangements set out herein and instead extends to encompass all arrangements, and modifications and alterations thereto. For example, whilst the embodiments described in the foregoing description refer to GPS, it should be noted that the devices may utilise any kind of position sensing technology as an alternative to, or indeed in addition to, GPS. For example, the devices may utilise other global navigation satellite systems, such as the European Galileo system. Equally, it is not limited to satellite-based systems, but could readily function using ground-based beacons or other kind of system that enables the device to determine its geographic location.

It will also be understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of managing vehicle requests at a server, the server having access to data indicative of a current location of each of a plurality of vehicles, the method comprising:
receiving, from each vehicle of the plurality of vehicles, corresponding real time indications of current locations of that vehicle that were acquired using one or more location sensing systems associated with that vehicle;
receiving a plurality of vehicle requests at a server;
generating, by the server, one or more clusters and allocating each vehicle request to a given cluster, wherein said allocating a vehicle request to a given cluster comprises determining whether a vehicle request relates to an existing cluster, and, based on the determination, (i) allocating the vehicle request to an existing cluster or (ii) using the vehicle request to generate a new cluster and allocating the vehicle request to the new cluster;
associating, with each cluster of the one or more clusters, a respective set of available vehicles that are suitable for fulfilling the vehicle requests allocated to the cluster, the associating comprising matching a vehicle with a given cluster based at least in part on a current position of the vehicle being within a specified distance of one or more locations that are determined for the given cluster;
matching, by the server, a vehicle from among the respective set of available vehicles to each vehicle request within the one or more clusters, the matching comprising:
computing a match value for each pairing of the vehicle requests and the vehicles in the respective set of available vehicles; and
determining a selected set of pairings of vehicle requests and vehicles from among the respective set of available vehicles having a highest average match value, the selected set of pairings including the match of a vehicle from among the respective set of available vehicles to each vehicle request; and
offering each vehicle request to the vehicle to which the vehicle request is matched.

2. The method of claim 1, wherein the server comprises communication means for communicating with a plurality of first devices, which are used to make a vehicle request, and a plurality of second devices associated with respective vehicles for fulfilling a submitted vehicle request.

3. The method of claim 2, wherein each first device has an associated location stored at the server, and wherein each vehicle request comprises at least a first location, the first location corresponding to the associated location.

4. The method of claim 2, wherein the first device comprises a mobile device having location determining means arranged to determine a current geographical position of the device, and wherein each vehicle request comprises at least a first location, the first location corresponding to the current geographic position of the first device.

5. The method of claim 1, wherein the vehicle request comprises data indicative of a pickup location and one or more of: a destination location; a pick-up time; one or more driver preferences; one or more vehicle preferences; a number of people to be picked up; and a desired driver rating.

6. The method of claim 1, further comprising associating data with each received vehicle request indicative of a time of receipt of the request at the server.

7. The method of claim 1, wherein the vehicle requests associated with each generated cluster are considered to be related to one another based on one or more relationship measures.

8. The method of claim 1, wherein the generating the new cluster comprises initiating the cluster or merging a plurality of existing clusters.

9. The method of claim 1, comprising at least one of:
adding a received vehicle request to an existing cluster when the received request is considered to be related to one or more of the existing requests of the cluster based on one or more relationship measures;
using a received vehicle request to generate a new cluster when the vehicle request is not considered to be related to any of the existing requests of an existing cluster based on one or more relationship measures; and
using a received vehicle request to create a new cluster by merging a plurality of existing clusters when it is determined that the received vehicle request is considered to be related to one or more of the existing requests of each of the plurality of clusters based on one or more relationship measures,
wherein the one or more relationship measures include at least a measure indicative of a geographical relationship.

10. The method of claim 9, wherein the one or more relationship measures include at least a measure indicative of a range requirement to be met by pick-up location data associated with a vehicle request in order for the request to be added to the cluster.

11. The method of claim 9, wherein the one or more relationship measures used to assess the relationship between a vehicle request and one or more existing vehicle requests of an existing cluster are defined based upon one or more of: a geographical distribution of the vehicle requests determined using locations associated with the vehicle requests in a geographical region based on one or more locations associated with the cluster; a geographical distribution of the vehicles based on current location data of vehicles in a geographical region based on one or more locations associated with the cluster; and a temporal distribution of vehicle requests in a geographic region based on one or more locations associated with the cluster.

12. The method of claim 1, wherein the step of matching a vehicle to each vehicle request of a cluster comprises matching a vehicle to each vehicle request within a cluster only when the cluster is considered to be complete by reference to either one of a time related threshold and a threshold in relation to a number of vehicle requests comprised by the cluster.

13. The method of claim 1, wherein the match value is computed based on an estimated time of arrival of the vehicle at the first or pick-up location associated with a corresponding vehicle request and one or more further criteria, the one or more further criteria including one or more of: user criteria; driver criteria; vehicle criteria; system criteria and criteria based on historical driver behavior and historical user behavior.

14. The method of claim 1, wherein the set of vehicles matched to the vehicle request of each cluster provides a set of primary order vehicles for fulfilling the vehicle requests of the cluster, wherein matching of each primary order vehicle to a vehicle request is carried out by reference to each other vehicle request of the cluster, and wherein the method further comprises allocating at least one second order vehicle to each request of the cluster by matching a vehicle to the request without consideration of other requests in the cluster.

15. The method of claim 14, comprising offering each vehicle request to the primary order vehicle for the request, and, if the request is not accepted in a given time, offering the request to the at least one second order vehicle for the request.

16. The method of claim 1, further comprising generating the one or more clusters based on one or more of: a geographical distribution of the plurality of vehicle requests determined using pick-up location data associated with each request; a geographical distribution of the plurality of vehicles determined using current location data for the vehicles; and a temporal distribution of the plurality of vehicle requests.

17. A non-transitory computer-readable medium comprising computer readable instructions which, when executed on a computing device, cause the computing device to perform a method of managing vehicle requests at a server, the server having access to data indicative of a current location of each of a plurality of vehicles, the method comprising:
receive, from each vehicle of the plurality of vehicles, corresponding real time indications of current locations of that vehicle that were acquired using one or more location sensing systems associated with that vehicle;
receiving a plurality of vehicle requests;
generating one or more clusters and allocating each vehicle request to a given cluster, wherein said allocating a vehicle request to a given cluster comprises determining whether a vehicle request relates to an existing cluster, and, based on the determination, (i) allocating the vehicle request to an existing cluster or (ii) using the vehicle request to generate a new cluster and allocating the vehicle request to the new cluster;
associating, with each cluster of the one or more clusters, a respective set of available vehicles that are suitable for fulfilling the vehicle requests allocated to the cluster, the associating comprising matching a vehicle with a given cluster based at least in part on a current position of the vehicle being within a specified distance of one or more locations that are determined for the given cluster;
matching, by the server, a vehicle from among the respective set of available vehicles to each vehicle request within the one or more clusters, the matching comprising:
computing a match value for each pairing of the vehicle requests and the vehicles in the respective set of available vehicles; and
determining a selected set of pairings of vehicle requests and vehicles from among the respective set of available vehicles having a highest average match value, the selected set of pairings including the match of a vehicle from among the respective set of available vehicles to each vehicle request; and
offering each vehicle request to the vehicle to which the vehicle request is matched.

18. A vehicle request management system, the system comprising a server having access to data indicative of a current location of each of a plurality of vehicles, the server comprising a processor arranged to:
receive, from each vehicle of the plurality of vehicles, corresponding real time indications of current locations of that vehicle that were acquired using one or more location sensing systems associated with that vehicle;
receive a plurality of vehicle requests;
generate one or more clusters and allocate each vehicle request to a given cluster among the one or more clusters, wherein said allocating a vehicle request to a given cluster comprises determining whether a vehicle request relates to an existing cluster, and, based on the determination, (i) allocating the vehicle request to an existing cluster or (ii) using the vehicle request to generate a new cluster and allocating the vehicle request to the new cluster;
associate, with each cluster of the one or more clusters, a respective set of available vehicles that are suitable for fulfilling the vehicle requests allocated to the cluster, the associating comprising matching a vehicle with a given cluster based at least in part on a current position of the vehicle being within a specified distance of one or more locations that are determined for the given cluster;
match a vehicle from among the respective set of available vehicles to each vehicle request within the one or more clusters, the matching comprising:
computing a match value for each pairing of the vehicle requests and the vehicles in the respective set of available vehicles; and
determining a selected set of pairings of vehicle requests and vehicles from among the respective set of available vehicles having a highest average match value, the selected set of pairings including the match of a vehicle from among the respective set of available vehicles to each vehicle request; and offer each vehicle request to the vehicle to which the vehicle request is matched.

19. The system of claim 18, further comprising generating the one or more clusters based on one or more of: a geographical distribution of the plurality of vehicle requests determined using pick-up location data associated with each request; a geographical distribution of the plurality of vehicles determined using current location data for the vehicles; and a temporal distribution of the plurality of vehicle requests.

\* \* \* \* \*